United States Patent [19]

Hayashi

[11] Patent Number: 5,699,128
[45] Date of Patent: Dec. 16, 1997

[54] METHOD AND SYSTEM FOR BIDIRECTIONAL MOTION COMPENSATION FOR COMPRESSION OF MOTION PICTURES

[75] Inventor: Naoya Hayashi, Tokyo, Japan

[73] Assignee: NEC Corporation, Tokyo, Japan

[21] Appl. No.: 534,302

[22] Filed: Sep. 27, 1995

[30] Foreign Application Priority Data

Sep. 28, 1994 [JP] Japan .................. 6-232721

[51] Int. Cl.$^6$ .................. H04N 7/36; H04N 7/50
[52] U.S. Cl. .................. 348/699; 348/402; 348/407; 348/413; 348/416
[58] Field of Search .................. 348/699, 402, 348/407, 413, 416; H04N 7/36, 7/50

[56] References Cited

U.S. PATENT DOCUMENTS

| | | | |
|---|---|---|---|
| 5,012,336 | 4/1991 | Gillard | 348/699 |
| 5,132,792 | 7/1992 | Yonemitsu | 348/699 |
| 5,227,878 | 7/1993 | Puri | 348/699 |

FOREIGN PATENT DOCUMENTS 63-144626  6/1988  Japan.

*Primary Examiner*—Howard W. Britton
*Attorney, Agent, or Firm*—Whitham, Curtis, Whitham & McGinn

[57] ABSTRACT

A motion compensation processor reads a small regions at the center portion of a forward reference region and a small region at the center portion of a backward reference region preliminarily assigned thereto and determines a coding type. Another motion compensation processor reads a small region at the left side of the forward reference region and a small region at the right side of the backward reference region and determines a coding type. A further motion compensation processor reads a small region at the left side of the forward reference region and a small region at the right side of the backward reference region and determines a coding type. By this parallel processing is enabled to obtain a prediction block having high similarity to a current block more efficiently than the prior art and facilitate realization of a bidirectional predicting system.

12 Claims, 12 Drawing Sheets

METHOD AND SYSTEM FOR BIDIRECTIONAL MOTION COMPENSATION FOR COMPRESSION OF MOTION PICTURES

BACKGROUND OF THE INVENTION

1. Field of the Invention

The present invention relates generally to a method and a system for compression of motion pictures. More specifically, the invention relates to a method and a system for motion compensation in both of past and future directions to be employed in a video encoder which compresses the amount of data in motion pictures.

2. Description of the Related Art

Bidirectional motion compensation method has been employed in video encoders which performs data compression of motion pictures. Since the amount of data in motion pictures are generally huge, such motion pictures are frequently compressed for transmission and storage, and decompressed at reception or reproduction side. Such data compression and decompression is also referred to encoding and decoding. For example, ITU-T Recommendation H.261 system to be employed in a picture telephone, video teleconference and so forth, Motion Picture Expert Group (MPEG) to be employed for recording in a storage medium and so forth have been know as such coding and decoding systems.

In such compression system, the interframe predictive coding system has been employed. The interframe predictive coding system utilizes a high correlation between respective frames forming the motion pictures. Therefore, in such system, high compression ratio is achieved by preparing a prediction frame from precedingly coded frame and by coding a difference, i.e. prediction error between the currently coded frame (hereinafter referred to as "current frame") and the prediction frame.

On the other hand, an object in motion slightly varies its position in the frame per frames. Therefore, by deriving prediction error after moving the prediction frame according to the motion of the object, the prediction error can be made smaller to permit further increasing compression ratio. The information indicative of such motion is referred to as motion vector and transmitted or recorded together with the prediction error.

The prediction frame is generated on the basis of the frame which has been transferred or recorded in the past. However, in the MPEG system, in addition to the frame of a several frames before (hereinafter referred to as "past reference frame"), a frame of several frames later (hereinafter referred to as "future frame") is provided to generate a virtual frame by interpolating the past frame and the future frame in time base direction, as the prediction frame.

When the prediction frame is derived from the future frame, the current frame is coded after the related future frame, changing the order of the frames.

In contrast, when correlation between the current frame and the prediction frame is low, such as scene change in the case where motion pictures are switched, higher compression ratio can be obtained by coding the current frame, than by coding from the prediction error. Accordingly, the compression is performed by appropriately switching the case where the prediction error is coded and the case where the current frame is coded as it is.

In the discussion given hereinafter, the prediction, in which the past frame is taken as the prediction frame is referred to as "forward predictive coding", the prediction, in which the future frame is taken as the prediction frame, is referred to as "backward predictive coding", the prediction, in which the virtual frame derived by interpolation of the past and future frames in the time base direction is taken as the prediction frame, is referred to as "bidirectional predictive coding". Furthermore, the foregoing three types of predictive coding are generally referred to as "interframe predictive coding". Also, the coding for coding the current frame as it is, is referred to as "intraframe coding".

When motion pictures are coded by MPEG system, the coding of the frames is performed as illustrated in FIG. 12. In FIG. 12, for ten frames, the signs I, P, B representing the types of the frames and numbers of the frames are given for identifying respective frames.

The type of the frame represents the type of the coding system which can be employed for respective individual frames. For instance, in case of the frame identified by the reference sign I is the frame, in which all blocks are coded by intraframe coding. The frame identified by the reference sign P, forward predictive coding or the intraframe coding are selectively used with respect to each individual block in the frame.

The frame identified by the reference sign B is the frame, in which the forward predictive coding, the backward predictive coding, the bidirectional predictive coding or the intraframe coding are selectively used with respect to each individual block in the frame. Such coding system employed for respective individual block in the frame is referred to as "block coding type" and, occasionally as "coding type".

The forward predictive coding refers to the most recent I frame or P frame in the past. On the other hand, the backward predictive coding is refered to the next I frame or P frame.

The bidirectional predictive coding refers to the most recent I frame or P frame in the past and to the next I frame or P frame.

Namely, when the P frame is coded by the forward predictive coding or the intraframe coding, the frame P4 makes reference to I1 frame and the frame P7 makes reference to the frame P4.

On the other hand, when the B frame is coded by one of the forward predictive coding, the backward predictive coding, the bidirectional predictive coding and the intraframe coding, the frames B2 and B3 make reference to the frames I1 and P4, the frames B5, B6 make reference to the frames P4 and P7, and frames B8, B9 make reference to the frames P7, I10, respectively.

It should be noted that, for making reference to the future frame, such future frame is to have been coded before the current frame is coded. Therefore, the order of coding becomes I1→P4→B2→B3→P7→B5→B6→I10→B8→B9.

Namely, the first frame I1 is coded by intraframe coding for respective blocks. Then, the next frame P4 is coded by one of the coding type of the forward predictive coding and the intraframe coding for respective blocks in the frame, with reference to the frame I1.

Subsequently, the frames B2 and B3 are respectively coded by one of the coding type of the forward predictive coding with reference to the frame I1, the backward predictive coding with reference to the frame P4 and the bidirectional predictive coding with reference to the frames I1 and P4, for respective blocks in the frame.

The frame P7 is coded by one of the coding type of the forward predictive coding with reference to the frame P4 or the intraframe coding for respective blocks in the frame.

Also, the next frames B5 and B6 are respectively coded by one of the coding type of the forward predictive coding with reference to the frame P4, the backward predictive coding with reference to the frame P7 and the bidirectional predictive coding with reference to the frames P4 and P7, for respective blocks in the frame.

Respective blocks in the frame I10 are coded by the intraframe coding. Respective blocks in the frames B8 and B9 are respectively coded by one of the coding type of the forward predictive coding with reference to the frame P7, the backward predictive coding with reference to the frame I10 and the bidirectional predictive coding with reference to the frames P7 and I10.

In the video encoder according to the MPEG system, the coding of the current frame H as shown in FIG. 11 is performed by applying respective blocks in the current frame H to the input terminal 100 of the system shown in FIG. 10. Here, among respective blocks in the current frame H, the block currently in process is referred to as "current block H1".

In a reference frame memory 110, reference frames to be made reference to upon the interframe predictive coding. For instance, before coding of the frame I1 of FIG. 12, null data are contained in the reference frame memory 110. However, during processing of the frame I1, after coding by means of a subtractor 101, a Discrete Cosine Transformer (DCT) 102 and quantizing portion 103, the coded frame I1 which is decoded by a reverse quantizer 105, a reverse DCT 106 and an adder 107 is stored in the reference frame memory 110.

When the frame P4 following the frame I1 is coded, the frame P4 which is once coded and then decoded is stored in the reference frame memory 110.

Accordingly, in the reference frame memory 110, the already coded past frame I1 and the future frame P4 are stored while the frames B2 and B3 are coded.

Upon coding the frame P7 subsequent to the frames B2 and B3, the frame P7 which is once coded and then decoded, is replaces the frame I1 in the reference frame memory 110.

Similarly, upon coding the frame I10, the frame I10 which is once coded and then decoded, is stored in the reference frame memory 110 in stead of the frame P4.

Namely, in the reference frame memory 110, the frame which is coded and then decoded during the current process, is stored instead of the preliminarily stored frames, for updating the content thereof.

The subtractor 101 derives a difference between an input current block H1 and a predicted block supplied from a motion compensation portion 111 and outputs the resultant difference to a DCT portion 102. The motion compensation portion 111 determines the coding type for the current block and outputs the predicted block corresponding to the determined coding type.

For instance, in case of the block in the I frame, since the coding type becomes intraframe coding, the block having "0" in all values is output as the prediction block.

On the other hand, in case of the block in the P frame, if the coding type is forward predictive coding, a forward prediction block generated from the past reference frame is output as the prediction block. If the coding type is the intraframe coding, the block having "0" in all values is output as the prediction block.

In case of the block in the B frame, if the coding type is forward predictive coding, a forward prediction block generated from the past reference frame is output as the prediction block. If the coding type is the backward predictive coding, a backward prediction block generated from the future reference frame is output as the prediction block. When the coding type is the bidirectional predictive coding, a bidirectional prediction block generated from the past and future reference frames is output as the prediction block. On the other hand, if the coding type is the intraframe coding, the block having "0" in all values is output as the prediction block.

Accordingly, when the coding type of the current block H1 is the intraframe coding, the block having "0" in all values is output as the prediction block. Thus, the current block H1 is output as it is from the subtractor 101.

In case other than the coding type of the intraframe coding, the predicted error block as a difference between the current block H1 and the prediction block generated through the interframe prediction is output. The current block H1 or the predicted error block is transformed into frequency components by two-dimensional discrete cosine transformation in the DCT 102, and output to the quantizing portion 103.

The quantizing portion 103 divides the frequency components supplied from the DCT 102 by a parameter called a quantizing threshold value. The quantizing threshold value is generally large in the high frequency components and small in the low frequency components. Therefore, the high frequency components is coarsely quantized and the low frequency components is finely quantized.

By this, while certain amount of information in the high frequency components can be lost, the information of the high frequency components is not visually perceptible and the compression without image quality degradation is achieved. The quantized frequency components is further compressed utilizing statistical nature by a Huffman coding portion 104, and output to a terminal 109 via a selector 108.

On the other hand, when the current frame H is I frame or P frame, since the I frame or the P frame is used as prediction frame for the subsequent frame, the quantized frequency components are also output to the reverse quantizing portion 105 to retrieve the original frequency components by multiplication of the quantized frequency components and the quantizing threshold value.

The retrieved frequency components are subject to a two-dimensional inverse discrete cosine transformation by the inverse DCT 106 for retrieving the current block or the predicted error block. The current block or the predicted error block which is retrieved, is output to the adder 107. It should be noted that, for the fact that the frequency components are once subject to quantization and due to calculation error in the DCT portion 102 and the inverse DCT portion 106, the retrieved current block H1 or the retrieved predicted error block cannot be identical to the original ones. However, the retrieved current block H1 or the retrieved error block have values sufficiently close to the original ones.

In the adder 107, the current block H1 or the predicted error block is added to the prediction block output from the motion compensation portion 111. Accordingly, when the coding type is intraframe coding, the retrieved current block is added to the block having "0" in all values to decode the current block.

On the other hand, when the coding type is interframe predictive coding, the retrieved predicted error block and the prediction block are added. Thus, similarly to the above, the current block is decoded.

The current block decoded as set forth above is stored in the reference frame memory 110 in order, as a replacement of the block of the older frame for use as the prediction frame for the subsequent frames.

The motion compensation portion 111 comprises a motion vector detecting portion 112, a prediction error evaluating portion 113, a forward predicting block generating portion 114, a backward predicting block generating portion 115, a bidirectional predicting block generating portion 116, a coding type judgement portion 117, and a selectors 118 and 119. To the motion compensation portion 111, the current block H1 and the reference region J1 of the reference frame J read from the reference frame memory 110 are supplied (see FIG. 11).

The reference region J1 generally includes a block at the same position as the current block H1, in the reference frame and has greater region than the current block H1. In case of the MPEG system, both of the current block H1 and the reference region J1 are of the luminance signal.

When P frame is coded, the reference region is read from the past frame stored in the reference frame memory 110. On the other hand, when the B frame is coded, respective reference regions from the past frame and the future frame stored in the reference frame memory 110 are read out. On the other hand, when the I frame is coded, prediction of motion is not necessary, and the reference region becomes unnecessary to be read out.

In the motion vector detecting portion 112, a block J2 having the closest content to the current block H1 in the reference region (hereinafter referred to as "similar block") and the motion vector are detected. The relationship on the frame is shown in FIG. 11.

A difference between the position H2 projecting the similar block J2 detected in the reference region J1 on the current frame and the position of the current block H1 becomes a motion vector H3. The motion vector detected from the past reference frame will be hereinafter referred to as "forward motion vector", and the motion vector detected from the future reference frame will be hereinafter referred to as "backward motion vector".

When the P frame is coded, the detected forward motion vector is output to the forward prediction block generating portion 114. On the other hand, when the B frame is coded, detected forward motion vector is output to the forward prediction block generating portion 114 and the backward motion vector is output to the backward prediction block generating portion 115.

In the motion vector detecting portion 112, in addition to detection of these motion vector, calculation of a sum of absolute value of AC component (sum of the absolute value of the deviation from the average value) of the current block is derived. The derived sum of the absolute value of the AC component is output to a coding type judgement portion 117.

The forward prediction block generating portion 114 reads out the portion corresponding to the motion vector of the past reference frame from the reference frame memory 110, i.e. the similar block, and set the read similar block as the forward prediction block.

The backward prediction block generating portion 115 reads out the portion corresponding to the motion vector of the future reference frame from the reference frame memory 110, i.e. the similar block, and set the read similar block as the backward prediction block.

A bidirectional prediction block generating portion 116 averages the forward prediction block from the forward prediction block generating portion 114 and the backward prediction block from the backward prediction block generating portion 115 and outputs the bidirectional prediction block.

The forward prediction block generated by the forward prediction block generating portion 114, the backward prediction block generated by the backward prediction block generating portion 115 and the bidirectional prediction block generated by the bidirectional prediction block generating portion 116 are fed to the prediction error evaluating portion 113 and the selector 118.

To the prediction error evaluating portion 113, the current block input through a terminal 100 is also supplied. The prediction error evaluating portion 113 evaluates similarity of the prediction block and the current block to select the interframe predictive coding system, on which the best evaluation of similarity is given.

Namely, in case of the P frame, only the forward predictive coding can be employed. Therefore, the prediction error evaluating portion 113 derives data for evaluating similarity between the forward prediction block and the current block.

Then, the prediction error evaluating portion 113 outputs the evaluation data and the selection signal indicative of the forward predictive coding to the coding type judgement portion 117. In conjunction therewith, the prediction error evaluating portion 113 outputs the selection signal to the selector 118, and, by the selection signal, the selector 118 selects the forward prediction block to output to the selector 119.

On the other hand, in case of the B frame, one of the forward predictive coding, the backward predictive coding and the bidirectional predictive coding can be employed. Therefore, the prediction error evaluating portion 113 derives calculated data for evaluating similarity between the current block, and the forward prediction block, the backward prediction block and the bidirectional prediction block, respectively.

Then, the prediction error evaluating portion 113 outputs the evaluation data and the selection signal indicative of the interframe predictive coding system whose prediction block is most similar to the current block, to the coding type judgement portion 117. In conjunction therewith, the prediction error evaluating portion 113 outputs the selection signal to the selector 118, and the selector 118 selects the prediction block indicated by the selection signal to output to the selector 119.

The coding type judgement portion 117 compares the input evaluation data and the sum of the absolute value of the AC component of the current block for estimating which of the interframe predictive coding selected by the prediction error evaluating portion 113 and the intraframe coding will have smaller code amount.

When the coding type judgement portion 117 makes a judgement that the intraframe coding will have smaller code amount, the coding type judgement portion 117 outputs a signal indicative of the intraframe coding as the coding type to the selectors 108 and 109.

On the other hand, when the coding type judgement portion 117 makes judgement that the interframe predictive coding selected by the prediction error evaluating portion 113 will have smaller code amount that the intraframe coding, the coding type judgement portion 117 outputs the signal indicative of the corresponding interframe predictive coding as the coding type to the selectors 108 and 109.

It should be noted that the coding type judgement portion 117 constantly outputs the signal indicative of the intraframe coding as the coding type to the selectors 108 and 109 while I frame is coded.

The selector 119 outputs a block having "0" in all values while the coding type is the intraframe coding, and outputs the prediction block output from the selector 118 when the coding type is the interframe predictive coding.

As set forth above, the motion compensation portion 111 outputs the coding type of the current block and the prediction block. On the other hand, the motion compensation portion 111 outputs the forward motion vector when the coding type is the forward predictive coding, the backward motion vector when the coding type is the backward predictive coding, and respective of the forward and backward vectors when the coding type is the bidirectional predictive coding.

These motion vectors and the coding type are output according to a predetermined data format through the terminal 109 via the selector 108, together with the prediction error block or the current block which is compressed by Huffman coding. As set forth above, the current frame is compressed per blocks.

The purpose of the motion compensation portion 111 is to detect the motion vector by searching out the similar block in the reference region, to output the prediction block with the determined coding type.

Among these processes, detection of the motion vector is performed with employing a method, in which blocks having the same size to the current block in the reference region (hereinafter referred to as "reference block") are extracted and, normally for each extracted block, a sum of the absolute errors of the pixels forming a block (hereinafter referred to as "distortion") is calculated to select one block having the smallest sum as the similar block.

Namely, assuming that the size of the block is (M pixels in the horizontal direction)×(M pixels in the vertical direction), the current block is f(ix, iy), the reference block extracted from the reference region is g(ix+vx, iy +vy) (wherein ix, iy are coordinate in the horizontal and vertical directions, respectively, and is $0 \leq ix$, $iy \leq M-1$), and vx, vy are horizontal and vertical components representative of a difference of position to the current block). Then, the distortion can be expressed by:

$$\text{sum} = \sum_{ix=0}^{M-1} \sum_{iy=0}^{M-1} |g(ix+vx, iy+vy) - f(ix,iy)| \quad (1)$$

Therefore, the similar block is the reference block having the smallest sum of the absolute value of the prediction error expressed by the foregoing equation (1), and the motion vector at that time is (vx, vy).

In the following discussion, the process of calculation of the sum of the absolute value of the prediction error of the reference blocks extracted from the reference region and the current block will be referred to as "block matching".

Basically, it is desirable to select the coding type by comparing the code amount in the cases of all possible intraframe predictive coding and the interframe coding applicable for the current block and by selecting one having the smallest code amount.

However, in such a case, it becomes necessary to perform coding twice for the P frame and four times for the B frame to inherently expand the process period. Therefore, such method has not be generally employed. As a replacement, it is a typical method to estimate which coding system will have the smallest code amount for determining the coding type.

In such a method, an evaluation data of similarity between the prediction block of the interframe predictive coding and the current block is calculated, and the evaluation data is compared with the sum of the absolute value of the AC components (hereinafter refered to as "AC power") of the current block.

Here, the sum of the absolute value of the AC component may be expressed by the following equation.

$$\text{sum} = \sum_{ix=0}^{M-1} \sum_{iy=0}^{M-1} |f(ix,iy) - favr| \quad (2)$$

Where favr $$\sum_{ix=0}^{M-1} \sum_{iy=0}^{M-1} f(ix,iy)/(M \times M)$$

As one example of the evaluation data of similarity between the prediction block and the current block, the distortion derived with taking the forward prediction block as g(ix+vx, iy+vy) of the foregoing equation (1) can be employed for the P frame.

On the other hand, in case of the B frame, the smallest sum in three kinds of sums of the absolute values of the prediction errors derived with taking the forward prediction block, the backward prediction block, the bidirectional prediction block as g(ix+vx, iy +vy) of the foregoing equation (1) can be employed.

In comparison between the evaluation data and the sum of the absolute values of the AC power, if the evaluation data is smaller than the AC power, the interframe predictive coding is selected. On the other hand, when the evaluation data is greater than or equal to the sum of the absolute values of the AC component, the intraframe coding is selected.

Accordingly, in the block of the P frame, one of the forward predictive coding and the intraframe coding is selected. On the other hand, in the block of the B frame, one of the forward predictive coding, the backward predictive coding, the bidirectional predictive coding and the intraframe coding is selected in adaptive manner to perform coding. It should be noted that the block in the I frame, the intraframe coding is always selected.

As the system for implementing the motion prediction as set forth above, a bidirectional predictive coding system as illustrated in FIG. 7 is available. The motion compensation processor 50 of this bidirectional predictive coding system temporarily stores the current block and two reference blocks read from the past and future reference frames in the internal memories 52 to 54 for reducing times of reading out from the external memory which requires relatively long reading out time. Then, the necessary pixel is read out from the internal memories 52 to 54 instead of the reference frame memory 9 for prompt process (caching).

In FIG. 7, address generator 51 of the motion compensation processor 50 generates an address signal for reading out the current block from a current frame memory 1, and stores the current block read out from the current frame memory 1 in a current block memory 52. An address generator 56 generates an address signal for reading out the current block from the current block memory 52.

An address generator 55 generates an address signal for reading a reference region from a reference frame memory 9. The reference region of the past reference frame (hereinafter referred to as forward reference region) read out from the reference frame memory 9 is stored in a forward reference region memory 53. An address generator 57 generates an address signal for reading out the forward reference region from the forward reference region memory 53.

The reference region of the future reference frame (hereinafter referred to as backward reference region) read out from the reference frame memory 9 is stored in a backward reference region memory 54. An address generator 58 generates an address signal for reading out the backward reference region from the backward reference region memory 54.

An arithmetic portion 59 performs the calculation of distortion on the basis of the current block from the current block memory 52 and the forward reference region from the forward reference region memory 53 (via the selector 68), or on the basis of the current block and the backward reference region from the backward reference region memory 54 (via the selector 68), and select the similar block which has the smallest distortion thereamong. The arithematic portion 59 also calcutates AC power using the current block and AC powere register 61 (via the selector 68) to detect the sum of the absolute values of the AC components and to detect one of the sums having the smallest value thereamong.

A packet address generator 60 generates an address signal for outputting the coding type, the forward vector and the backward vector. An AC register 61 stores the sum of the absolute values of the AC component of the current block.

A forward motion vector register 62 stores the forward motion vector. A backward motion vector register 63 stores the backward motion vector. A coding type selector 64 makes judgement of the coding type of the current block. An averaging portion 65 derives the bidirectional prediction block on the basis of the forward prediction block and the backward prediction block.

An interframe prediction selector 66 selects one of interframe predicting coding. A controller 67 controls operation timing of the overall motion compensation processor 50.

Here, correspondence is established between the motion compensation processor 50 illustrated in FIG. 7 and the motion compensation portion 111 illustrated in FIG. 10 as follows.

The process performed by the motion vector detecting portion 112 of the motion compensation portion 111 is realized by the forward reference region memory 53, the backward reference region memory 54, the address generators 57 and 58, arithmetic portion 59, the selector 68, the AC register 61, the forward motion vector register 62 and the backward motion vector register 63 of the motion compensation processor 50.

On the other hand, the process performed by the forward prediction block generating portion 114 can be realized by the forward reference region memory 53 and the address generator 57. The process performed by the backward prediction block generating portion 115 is realized by the backward reference region memory 54 and the address generator 58.

The process performed by the bidirectional prediction block generating portion 116 is realized by the averaging portion 65. On the other hand, the process performed by the prediction error evaluating portion 113 is realized by the interframe prediction selector 66. The process of the coding type judgement portion 117 is realized by the coding type selector 64.

Next, the operation of the motion compensation processor 50 will be discussed in terms of the current block having horizontal M pixels×vertical M pixels, and forward and backward reference regions respectively having rectangular regions around the current block of horizontal NH pixels× vertical NV pixels (NH>M, NV>M).

The current block memory 52, the forward reference region memory 53 and the backward reference region memory 54 have capacities for storing the above-identified size of the current block and the forward and backward reference regions.

On the other hand, unless otherwise specified, the following discussion will be given for the case of coding of the B frame. While only forward predictive coding is performed as the interframe predictive coding for the P frame and only intraframe coding is performed for the I frame, the process for the P frame and the I frame can be realized by a minor partial modification of the process for the B frame. Therefore, discussion for predictive coding for the P and I frames will be excluded for keeping the disclosure simple enough to facilitate a clear understanding.

In the motion compensation processor 50, at first, the forward motion vector is detected, and subsequently, the backward motion vector is detected. The motion compensation processor 50 simultaneously generates the forward prediction block, the backward prediction block and the bidirectional prediction block, and generates evaluation data for evaluating similarity of those prediction blocks and the current block.

The motion compensation processor 50 selects one interframe predictive coding system among the forward predictive coding, the backward predictive coding and the bidirectional predictive coding on the basis of the evaluation data, and then determines the coding type through comparison between the interframe predictive coding and the intraframe coding. Subsequently, the motion compensation processor 50 outputs the determined coding type, the motion vector and the prediction block.

In the motion compensation processor 50, detection of the forward motion vector is performed in the following manner. At first, the address generator 56 generates the read address signal of the current block memory 52. Then the current block is read out from the current block memory 52 and fed to the arithmetic portion 59.

On the other hand, the address generator 57 generates the read address signal of the forward reference region memory 53. Then, the reference block of horizontal M pixels and vertical M pixels located at the most left upper position in the forward reference region is extracted. The forward reference block thus extracted is fed to the arithmetic portion 59 via the selector 68.

The arithmetic portion 59 performs an arithmetic operation according to the foregoing equation (1) to derive the distortion. Namely, the arithmetic portion 59 performs block matching between the current block and the reference block located at the most left upper position in the forward reference region.

The arithmetic portion 59 stores the sum of the absolute values of the prediction error obtained through calculation of the foregoing equation (1), and a difference between the positions of the reference block and the current block, in an internal register (not shown).

Similarly to the foregoing process, the current block is supplied to the arithmetic portion 59. Then, the reference block which is extracted from the forward reference region in the forward reference region memory 53 and neighbored for one pixel in the horizontal direction on the preceding reference block located at the most left upper position, is also fed to the arithmetic portion 59. The arithmetic portion 59 then performs an arithmetic operation for block matching between the newly extracted reference block and the current block.

The arithmetic portion 59 compares the distortion derived at the current cycle of operation with the sum of the absolute values of the prediction error obtained in the preceding cycle, and stores the smaller one and the corresponding difference between the positions of the reference block and the current block.

The foregoing process is performed with respect to possible all of the reference blocks extracted from the forward reference region. Then, the distance between the positions of the reference block and the current block finally remained in the internal register becomes the forward motion vector. The forward motion vector thus derived is stored in the forward motion vector register 62. Thus, detection of the forward motion vector can be completed.

However, when the current block resides in the edges of the frame, a part of the reference region becomes out of the frame. For example, when the current block is located at the upper edge, the upper portion of the reference region of horizontal NH pixels×vertical (NV−M) pixels/2 pixels becomes out of the raster. When the current block is located at the left side end, the portion of (the horizontal (NH−M)/2 pixels)×vertical NV pixels of the left side of the forward reference region becomes out of the raster.

Since invalid pixels are stored in such portion of the forward reference region memory 53, the results of block matching between the current block and the reference block having such invalid pixels, should be ignored.

Accordingly, the arithmetic portion 59 monitors the position of the current block on the raster and the position of the reference block to ignore the result of block matching when the reference block contains the pixel out of the raster.

The backward motion vector can be detected in the similar procedure as detection of the forward motion vector by extracting the reference block from the backward reference region in the backward reference region memory 54. The detected backward motion vector is stored in the backward motion vector register 63.

Next, the forward prediction block, designated by the forward mortion vector from the foward mortion vector registor 62, is read from the forward reference region memory 53 by generating the read address signal from the address generator 57 for reading the reference blocks from the left upper pixel in order designated by the forward motion vector from the forward motion vector register 62.

Simultaneously, the backward prediction block is read from the backward reference region memory 54 by generating the read address signal from the address generator 58 for reading the reference blocks from the left upper pixel in the order designated by the backward motion vector from the backward motion vector register 63.

The pixels of the forward prediction block and the backward prediction block respectively read from the forward reference region memory 53 and the backward reference region memory 54 are averaged by the averaging portion 65. Thus, the pixels forming the bidirectional prediction block are output from the averaging portion 65.

In conjunction therewith, the current block is output from the current block memory 52 by generating the read address signal from the address generator 56 so that the pixels are read out in order from the left upper pixel.

In this manner, the current block and corresponding the forward prediction block, the backward prediction block and the bidirectional prediction block are output per one pixel in order to the interframe prediction selector 66.

In the interframe prediction selector 66, three prediction error accumulators (not shown) are provided to simultaneously derive three kinds of sums of the absolute values of the prediction error derived with taking the forward prediction block, the backward prediction block and the bidirectional prediction block as g(ix+vx, iy+vy) of the equation (1).

When input of the prediction block is completed, the interframe prediction selector 66 compares the sums of the absolute values of the prediction error and outputs a selection signal indicative of the interframe predicted coding system having the minimum sum of the absolute values of the prediction error to the coding type selector 64. The interframe prediction selector 66 also outputs the sum of the absolute values of the prediction error of the selected interframe predictive coding system as the evaluation data for evaluating the similarity of the prediction block and the current block to the coding type selector 64.

It should be noted that since only forward predictive coding can be employed for the P frame, the selection signal indicative of the forward predictive coding is constantly output for the P frame to the coding type selector 64, and the sum of the absolute values of the prediction error of the forward predictive coding to the coding type selector 64 as the evaluation data. The selection signal indicative of the forward predictive coding is also output to the selector 69.

Next, replacing "0" to the AC register 61, similarly to the case of detection of the forward motion vector, the current block read from the current block memory 52 is supplied to the arithmetic portion 59.

Simultaneously, the value of the AC register 61 is supplied to the arithmetic portion 59 via the selector 68, and derives the sum of the absolute values of the prediction error with taking "0" as g(ix+iv, iy+vy) of the equation (1).

By deriving favr of the equation (2) by dividing the sum of the absolute values of the prediction error with square of M, the derived value is stored in the AC register 61. Here, since M is 16, division can be realized by truncating lower 8 bits.

The process similar to the above is executed once again to derive the sum of the absolute values of the prediction error by supplying the current block and the value of the AC register 61 to the arithmetic portion 59 via the selector 68. Thus, the sum of the absolute value of the AC component of the equation (2) can be calculated. The sum of the absolute value of the AC component is stored in the AC register 61.

The derived sum of the absolute value of the AC component of the current block and the evaluation data output from the interframe prediction selector 66 are output to the coding type selector 64. When the evaluation data is smaller than the sum of the absolute value of the AC component, the coding type selector 64 makes a judgement to select the interframe predictive coding output by the interframe prediction selector 66. On the other hand, when the evaluation data is greater than or equal to the sum of the absolute value of the AC component, the intraframe coding is selected.

The coding type selector 64 outputs the result of the judgement to the selector 70. It should be noted that, in case of coding of the I frame, the coding type selector 64 selects constantly the intraframe coding.

Subsequently, the coding type of the current block from the coding type selector 64, the forward motion vector from the forward motion vector register 62 and the backward motion vector from the backward motion vector register 63 are sequentially output from the terminal 75, as respective results of prediction.

To the coding type selector 64, the forward motion vector register 62 and backward motion vector register 63, the packet address signal is supplied from the packet address generator 60.

In this case, the packet address "0" is assigned to the coding type, the packet address "1" is assigned to the forward motion vector, and the packet address "2" is assigned to the backward motion vector.

After completion of the processing of the current block, the packet address generator 60 updates addresses in the order of "0", "1", "2". Therefore, through the terminal 75, the coding type from the coding type selector 64 which constantly decodes the packet address, the forward motion vector from the forward motion vector register 62 and the backward motion vector from the backward motion vector register 63 are output, in order.

Next, the prediction block corresponding to the coding type is output per one pixel through the terminal 77. Therefore, the address generators 57 and 58 generate address signals for outputting the forward prediction block and the backward prediction block.

Accordingly, the forward prediction block is output from the forward reference region memory 53 to the selector 69. The backward prediction block is output from the backward reference region memory 54 to the selector 69. Also, the bidirectional prediction block is output from the averaging portion 65 to the selector 69.

The selector 69 selects one of the forward prediction block, the backward prediction block and the bidirectional prediction block depending upon the selection signal from the interframe prediction selector 66 and outputs to the selector 70.

Since the coding type is provided to the selector 70 from the coding type selector 64, the selector 70 outputs the block having "0" for all values when the intraframe coding is designated, through the terminal 77. On the other hand, the selector 70 outputs the prediction block selected by the selector 69 when the coding type other than the intraframe coding is designated, through the terminal 77.

The controller 67 controls the output timing of respective data set forth above depending upon a timing control signal input through a terminal 76.

As discussed above, the motion compensation processor 50 illustrated in FIG. 7 adaptively selects one of the forward predictive coding and the intraframe coding for the block of the P frame, one of the forward predictive coding, the backward predictive coding, the bidirectional predictive coding and the intraframe coding for the block of the B frame to output the result of prediction and the prediction block.

On the other hand, even for I frame, the result of prediction can be output. The block having "0" in all values can be output as the predictive block.

It should be noted that, among the results of prediction, the forward motion vector is only effective when the coding type is the forward predictive coding or the bidirectional predictive coding, the backward motion vector is only effective when the coding type is the backward predictive coding or the bidirectional predictive coding. Therefore, the effective motion vector is selected in accordance with the coding type out of the motion compensation processor 50.

In the conventional bidirectional motion compensation system, set forth above, the coding type of the current block, the motion vector depending upon the coding type and the prediction block are adaptively selected for outputting.

In such a bidirectional prediction system, the size of the reference region is horizontal NH pixels×vertical NV pixels and, it becomes necessary to perform (NH−M+1)×(NV−M+1) times of block matching and to select the minimum value from (NH−M+1)×(NV−M+1) in number of sums of the absolute values of the prediction error.

On the other hand, for one cycle of block matching, the arithmetic operation for deriving the sum of the absolute value of the error should be performed $M^2$ times. Furthermore, in the bidirectional predictive system, if the reference region is wider and within the raster, the possibility of finding the prediction block having a high similarity to the current block becomes higher to raise the compression ratio while maintaining image quality.

However, detection of the motion vector requires quite a large amount of calculation. Therefore, in order to widen the reference region, a correspondingly long time is required for detection of the motion vector in the arithmetic portion 59. Thus, it becomes difficult to apply this to real time video encoders.

On the other hand, in order to widen the reference region, the capacities of the forward reference region memory 53 and the backward reference region memory 54 are increased. This increases the chip size of an LSI, and thus causes increasing of the cost.

It should be noted that as a technology for shortening the process time in detection of the motion vector, a technology for predicting the size of the motion vector and whereby determining the size of the reference region with respect to each block, has been disclosed in Japanese Unexamined Patent Publication (Kokai) No. Showa 63-144626.

This is the technology to determine the size of the reference region by evaluating a difference between the reference block at the same position to the current block and the current block, or by making reference to the size of the motion vector detected with respect to the immediately previous coded block.

Namely, when the number of wasteful block matchings can be reduced by making the reference region smaller, the process time of the block can be shortened. However, since motion pictures have a constant frame period and contain a constant number of blocks per one frame, it is necessary to complete coding for the block in one frame within the period of one frame for steadily coding the frames.

Accordingly, when employing this technology, even when the prediction block having high similarity to the current block can be found by widening the reference region of the block, it becomes possible that all of the blocks cannot be processed within the period of one frame unless the process time can be shortened by narrowing the reference region for other blocks, correspondingly.

It is difficult to process all blocks in the frame within one frame period with determining the size of the reference region for each block.

SUMMARY OF THE INVENTION

Therefore, the present invention solves the problems set forth above. It is an object of the present invention to provide a bidirectional motion compensation method and system for efficiently searching vectors.

According to the first aspect of the invention, a bidirectional motion compensation method both in toward past and toward future in a video encoder performing compression of data amount of motion pictures, comprises the steps of:

performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

performing motion compensation in past on the basis of the first forward reference region and in future on the basis of the second backward reference region;

performing motion compensation in past on the basis of the second forward reference region and in future on the basis of the first backward reference region; and selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward reference region, the second forward reference region and the first backward reference region, and the third forward reference region and the third backward reference region.

Preferably, the bidirectional motion compensation method further comprises a step of outputting the prediction block for coding current block depending upon the selected coding type.

According to the second aspect of the invention, a bidirectional motion compensation method both in toward past and toward future in a video encoders performing compression of data amount of motion motion pictures, comprises the steps of:

performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

performing motion compensation in past on the basis of the first forward reference region and in future on the basis of the second backward reference region;

performing motion compensation in past on the basis of the second forward reference region and in future on the basis of the first backward reference region; and selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward reference region, the second forward reference region and the first backward reference region, and the third forward reference region and the third backward reference region, outputting a result of compensation including the coding type with inserting position information on the frame of the current block and an evaluation data for evaluating similarity of the prediction block and the current block before the result of compensation.

According to the third aspect of the invention, a bidirectional motion compensation method both in toward past and toward future in video encoder performing compression of data amount of motion pictures, comprises the steps of:

performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

performing motion compensation in past on the basis of the first forward reference region and in future on the basis of the second backward reference region;

performing motion compensation in past on the basis of the second forward reference region and in future on the basis of the first backward reference region; and selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward reference region, the second forward reference region and the first backward reference region, and the third forward reference region and the third backward reference region.

outputting prediction block for coding the current block depending upon selected coding type; and outputting a result of compensation including the coding type with inserting position information on the frame of the current block and an evaluation data for evaluating similarity of the prediction block and the current block before the result of compensation.

According to the fourth aspect of the invention, a bidirectional motion compensation method both in toward past and toward future in a video encoder performing compression of data amount of motion pictures, comprises the steps of:

performing motion prediction both in past and future on the basis of data of a third forward reference region among first, second and third forward reference regions within a forward prediction block generated from a past reference frame of motion pictures and mutually having equal areas, the first and second forward reference regions being in contact with each other, and the third forward reference region overlapping with the first and second forward reference regions in mutually equal areas, and data of a third backward reference region among first, second and third backward reference regions within a backward prediction block generated from a future reference frame of motion pictures and mutually having equal areas, the first and second backward reference regions being in contact with each other, and the third backward reference region overlapping with the first and second backward reference regions in mutually equal areas;

extracting the first forward reference region from the past reference frame and extracting the second backward reference region from the future reference frame;

performing motion prediction both in past and future on the basis of the first forward reference region and the second backward reference region;

extracting the second forward reference region from the past reference frame and extracting the first backward reference region from the future reference frame;

performing motion prediction both in past and future on the basis of the second forward reference region and the first backward reference region;

selecting a coding type among one method selected from interframe predictive coding employing forward prediction block, interframe predictive coding employing backward prediction block and interframe predictive coding employing bidirectional prediction block generated from the forward prediction block and the backward prediction block, and an intraframe coding method for coding a current block divided from the current frame of the motion pictures;

outputting a result of prediction including the coding type with inserting position information on the raster of the current block and an evaluation data for evaluating similarity of the prediction block and the current block before the result of compensation.

According to the fifth aspect of the invention, a bidirectional motion compensation method both in toward past and toward future in a video encoder performing compression of data amount of motion pictures, comprises the steps of:

performing motion prediction both in past and future on the basis of data of a third forward reference region among first, second and third forward reference regions within a forward prediction block generated from a past reference frame of motion pictures and mutually having equal areas, the first and second forward reference regions being in contact with each other, and the third forward reference region overlapping with the first and second forward reference regions in mutually equal areas, and data of a third backward reference region among first, second and third backward reference regions within a backward prediction block generated from a future reference frame of motion pictures and mutually having equal areas, the first and second backward reference regions being in contact with each other, and the third backward reference region overlapping with the first and second backward reference regions in mutually equal areas;

extracting the first forward reference region from the past reference frame and extracting the second backward reference region from the future reference frame;

performing prediction of motion both in past and future on the basis of the first forward reference region and the second backward reference region;

extracting the second forward reference region from the past reference frame and extracting the first backward reference region from the future reference frame;

performing prediction of motion both in past and future on the basis of the second forward reference region and the first backward reference region;

selecting a coding type among one method selected from interframe predictive coding employing forward prediction block, interframe predictive coding employing backward prediction block and interframe predictive coding employing bidirectional prediction block generated from the forward prediction block and the backward prediction block, and an intraframe coding method for coding a current block divided from the current frame of the motion pictures;

outputting prediction block for coding the current block depending upon selected coding type; and outputting a result of prediction including the coding type with inserting position information on the raster of the current block and an evaluation data for evaluating similarity of the prediction block and the current block before the result of compensation.

According to the sixth aspect of the invention, a bidirectional motion compensation system both in toward past and toward future in a video encoder performing compression of data amount of motion pictures, comprises:

means for performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

means for performing motion compensation in past on the basis of the first forward reference region and in future on the basis of the second backward reference region;

means for performing motion compensation in past on the basis of the second forward reference region and in future on the basis of the first backward reference region; and means for selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backword reference region, the second forward reference region and the first backward reference region, and the third forward reference region and the third backward reference region.

In the preferred composition, the bidirectional motion compensation system may further comprise means for outputting the prediction block for coding current block depending upon the selected coding type.

According to the seventh aspect of the invention, a bidirectional motion compensation system both in toward past and toward future in a video encoder performing compression of data amount of motion pictures, comprises:

means for performing motion prediction both in past and future on the basis of data of a third forward reference region among first, second and third forward reference regions within a forward prediction block generated from a past reference frame of motion pictures and mutually having equal areas, the first and second forward reference regions being in contact with each other, and the third forward reference region overlapping with the first and second forward reference regions in mutually equal areas, and data of a third backward reference region among first, second and third backward reference regions within a backward prediction block generated from a future reference frame of motion pictures and mutually having equal areas, the first and second backward reference regions being in contact with each other, and the third backward reference region overlapping with the first and second backward reference regions in mutually equal areas;

means for performing prediction of motion both in past and future on the basis of the first forward reference region and the second backward reference region;

means for performing prediction of motion both in past and future on the basis of the second forward reference region and the first backward reference region;

means for selecting a coding type among one method selected from interframe predictive coding employing forward prediction block, interframe predictive coding employing backward prediction block and interframe predictive coding employing bidirectional prediction block generated from the forward prediction block and the backward prediction block, and an intraframe coding method for coding a current block divided from the current frame of the motion pictures; and means for outputting a result of compensation including the coding type with inserting position information on the frame of the current block and an evaluation data for evaluating similarity of the prediction block and the current block before the result of compensation.

According to the eighth aspect of the invention, a bidirectional motion compensation system both in toward past and toward future in a video encoder performing compression of data amount of motion pictures, comprises:

means for performing motion prediction both in past and future on the basis of data of a third forward reference region among first, second and third forward reference regions within a forward prediction block generated from a past reference frame of motion pictures and mutually having equal areas, the first and second forward reference regions being in contact with each other, and the third forward reference region overlapping with the first and second forward reference regions in mutually equal areas, and data of a third backward reference region among first, second and third backward reference regions within a backward prediction block generated from a future reference frame of motion pictures and mutually having equal areas, the first and second backward reference regions being in contact with each other, and the third backward reference region overlapping with the first and second backward reference regions in mutually equal areas;

means for performing prediction of motion both in past and future on the basis of the first forward reference region and the second backward reference region;

means for performing prediction of motion both in past and future on the basis of the second forward reference region and the first backward reference region;

means for selecting a coding type among one method selected from interframe predictive coding employing forward prediction block, interframe predictive coding employing backward prediction block and interframe predictive coding employing bidirectional prediction block generated from the forward prediction block and the backward prediction block, and an intraframe coding method for coding a current block divided from the current frame of the motion pictures;

means for outputting prediction block for coding the current block depending upon selected coding type; and means for outputting a result of prediction including the coding type with inserting position information on the screen of the current block and an evaluation data for evaluating similarity of the prediction block and the current block before the result of compensation.

According to the ninth aspect of the invention, a bidirectional motion compensation system both in toward past and toward future in a video encoder performing compression of data amount of motion pictures, comprises:

means for performing motion prediction both in past and future on the basis of data of a third forward reference region among first, second and third forward reference regions within a forward prediction block generated from a past reference frame of motion pictures and mutually having equal areas, the first and second forward reference regions being in contact with each other, and the third forward reference region overlapping with the first and second forward reference regions in mutually equal areas, and data of a third backward reference region among first, second and third backward reference regions within a backward prediction block generated from a future reference frame of motion pictures and mutually having equal areas, the first and second backward reference regions being in contact with each other, and the third backward reference region overlapping with the first and second backward reference regions in mutually equal areas;

means for extracting the first forward reference region from the past reference frame and extracting the second backward reference region from the future reference frame;

means for performing prediction of motion both in past and future on the basis of the first forward reference region and the second backward reference region;

means for extracting the second forward reference region from the past reference frame and extracting the first backward reference region from the future reference frame;

means for performing prediction of motion both in past and future on the basis of the second forward reference region and the first backward reference region;

means for selecting a coding type among one method selected from interframe predictive coding employing forward prediction block, interframe predictive coding employing backward prediction block and interframe predictive coding employing bidirectional prediction block generated from the forward prediction block and the backward prediction block, and an intraframe coding method for coding a current block divided from the current frame of the motion pictures;

means for outputting a result of prediction including the coding type with inserting position information on the raster of the current block and an evaluation data for evaluating similarity of the prediction block and the current block before the result of compensation.

According to the tenth aspect of the invention, a bidirectional motion compensation system both in toward past and toward future in a video encoder performing compression of data amount of motion pictures, comprises:

means for performing motion prediction both in past and future on the basis of data of a third forward reference region among first, second and third forward reference regions within a forward prediction block generated from a past reference frame of motion pictures and mutually having equal areas, the first and second forward reference regions being in contact with each other, and the third forward reference region overlapping with the first and second forward reference regions in mutually equal areas, and data of a third backward reference region among first, second and third backward reference regions within a backward prediction block generated from a future reference frame of motion pictures and mutually having equal areas, the first and second backward reference regions being in contact with each other, and the third backward reference region overlapping with the first and second backward reference regions in mutually equal areas;

means for extracting the first forward reference region from the past reference frame and extracting the second backward reference region from the future reference frame;

means for performing prediction of motion both in past and future on the basis of the first forward reference region and the second backward reference region;

means for extracting the second forward reference region from the past reference frame and extracting the first backward reference region from the future reference frame;

means for performing prediction of motion both in past and future on the basis of the second forward reference region and the first backward reference region;

means for selecting a coding type among one method selected from interframe predictive coding employing forward prediction block, interframe predictive coding employing backward prediction block and interframe predictive coding employing bidirectional prediction block generated from the forward prediction block and the backward prediction block, and an intraframe coding method for coding a current block divided from the current frame of the motion pictures;

means for outputting prediction block for coding the current block depending upon selected coding type; and means for outputting a result of prediction including the coding type with inserting position information on the raster of the current block and an evaluation data for evaluating similarity of the prediction block and the current block before the result of compensation.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to unnecessarily obscure the present invention.

Before the detailed discussion of the preferred embodiment of the bidirectional prediction system and the method therefor, according to the present invention, the basic idea of the present invention will be discussed with reference to FIG. 8. Basically, the present invention is based on the idea that the process time for searching a motion vector of a current block can be shortened by reducing an area of a reference region which is referred in searching the motion vector.

Figure 8:
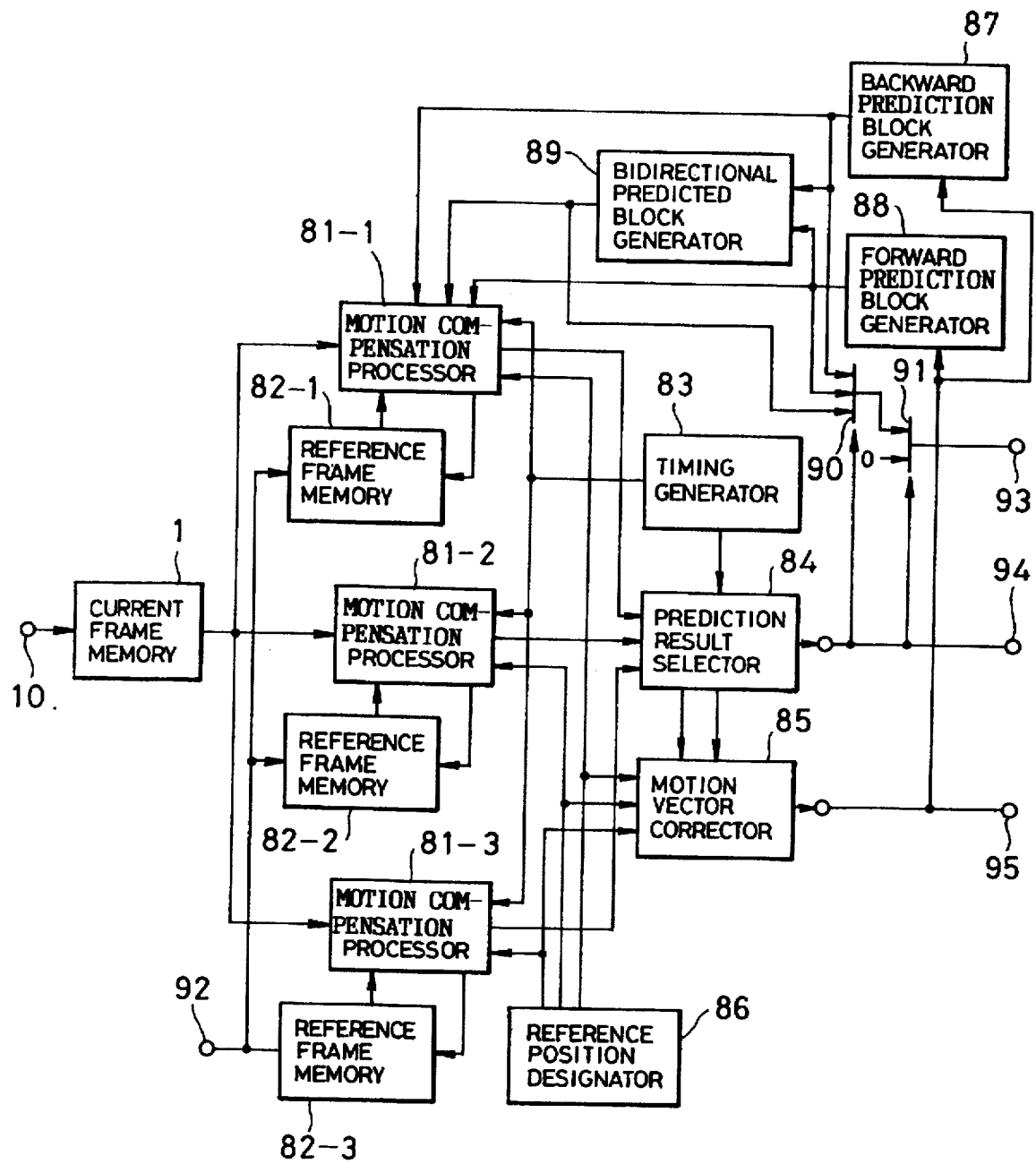
FIG. 8 is a block diagram showing a construction of the bidirectional prediction system in basic technology of the present invention.

As shown in FIG. 8, a bidirectional prediction system comprises a current frame memory 1, motion compensation processors 81-1 to 81-3, reference frame memories 82-1 to 82-3, a timing generator 83, a predicted result selector 84, a motion vector corrector 85, a reference position indicator 86, a backward prediction block generator 87, a forward prediction block generator 88, a bidirectional prediction block generator 89, a selectors 90 and 91 and terminals 10, 92 to 95.

Here, the forward reference region is divided into forward reference sub-regions r1, r0 and r2 in order from left. Also, the backward reference region is divided into backward reference sub-regions s1, s0 and s2 in order from left. For the motion prediction processor 81-1, the forward reference sub-region r0 at the center and the backward reference sub-region s0 at the center are assigned. For the motion prediction processor 81-2, the forward reference sub-region r1 at the left side and the backward reference sub-region s1 at the left side are assigned. For the motion prediction processor 81-3, the forward reference sub-region r2 at the right side and the backward reference sub-region s2 at the right side are assigned. Thus, the forward motion vector and the backward motion vector are detected.

In this case, the motion compensation processors 81-1 to 81-3 read out assigned forward reference region and backward reference region from the same reference frame stored in the reference frame memories 82-1 to 82-3 to detect the forward motion vectors and the backward motion vectors.

The positions of the forward reference region and the backward reference region respectively assigned to the motion compensation processors 81-1 to 81-3 are designated by the reference position designator 86. The motion compensation processors 81-1 to 81-3 perform block matching with a common current block supplied from the current frame memory 1, in respectively the designated forward reference regions and the designated backward reference regions, to detect the forward motion vector and the backward motion vector.

Since the forward reference regions and the backward reference regions assigned for the motion compensation processors 81-1 to 81-3 have the same size, when the processes are initiated simultaneously, the processes will be terminated simultaneously. The results of compensation, such as detected motion vector and so forth are output simultaneously to the prediction result selector 84.

However, since the motion compensation processors 81-1 to 81-3 respectively detect the motion vector under the premise that the current block is located at the center of the reference region on the raster, it becomes necessary to correct the motion vector output by the motion compensation processors 81-2 and 81-3.

The prediction result selector 84 selects one of the motion compensation processors. Then, the motion vector output by the selected one of the motion compensation processors is corrected and output by the motion vector corrector 85 according to the position of the reference region.

Figure 9:
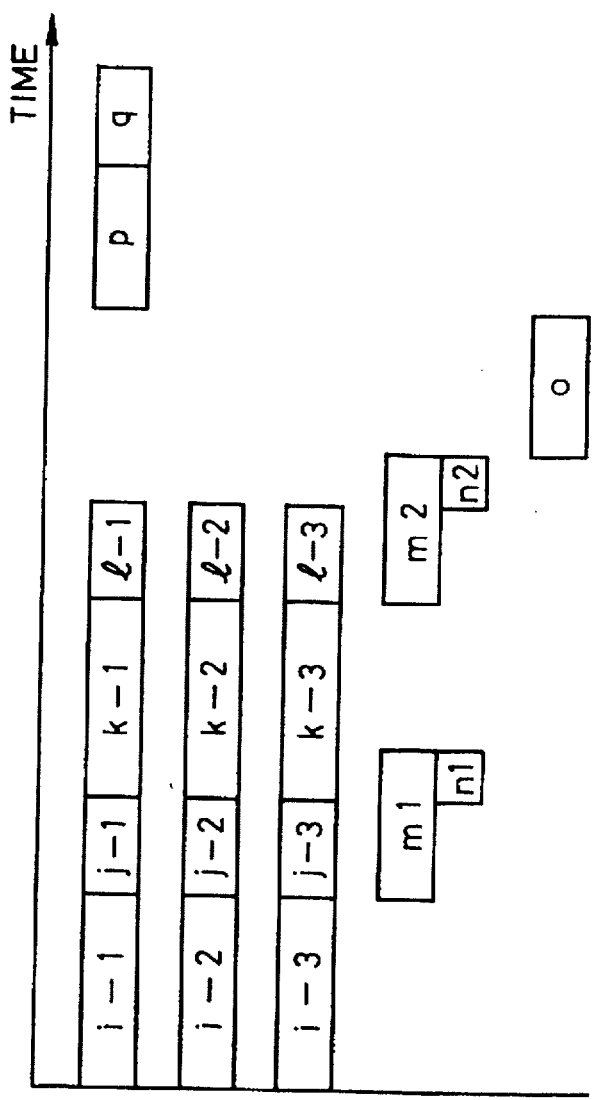
FIG. 9 is an illustration showing a block processing timing of the equipment shown in FIG. 8.
Figure 10:
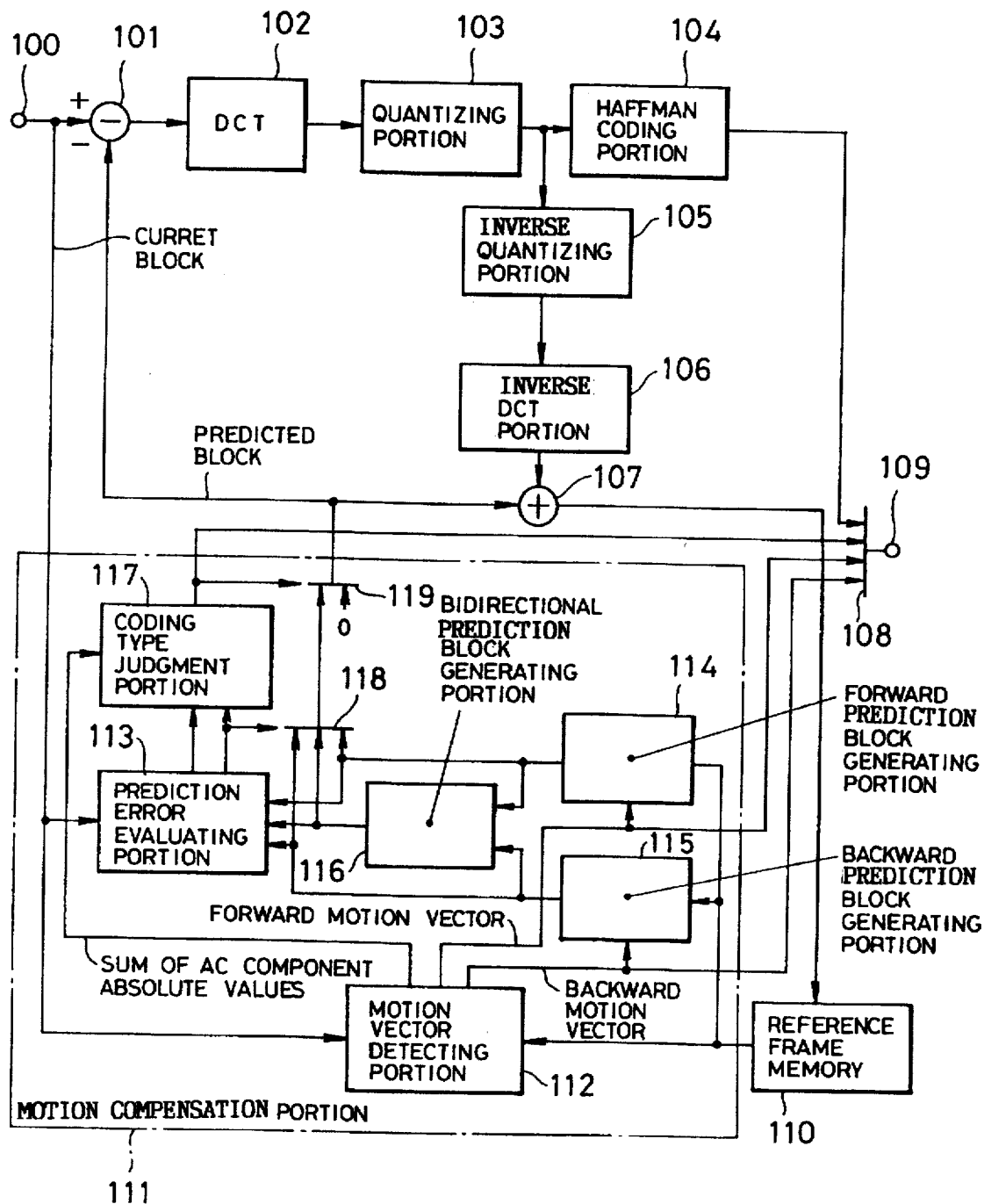
FIG. 10 is an illustration showing explanation of a video encoder in the prior art.
Figure 11:
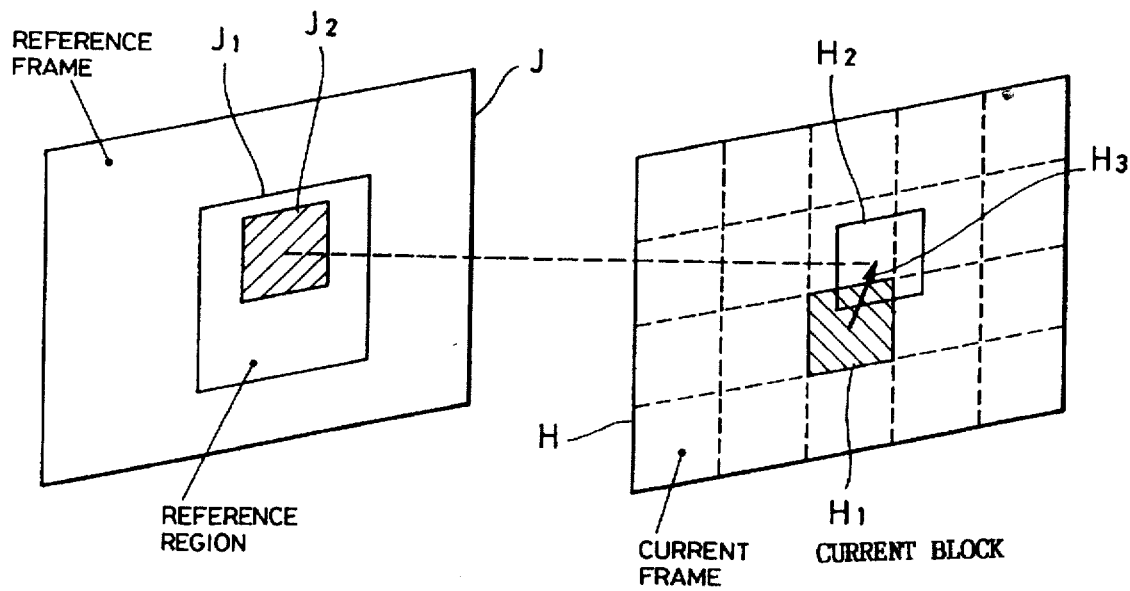
FIG. 11 is an illustration showing an explanation of the motion vector.
Figure 12:
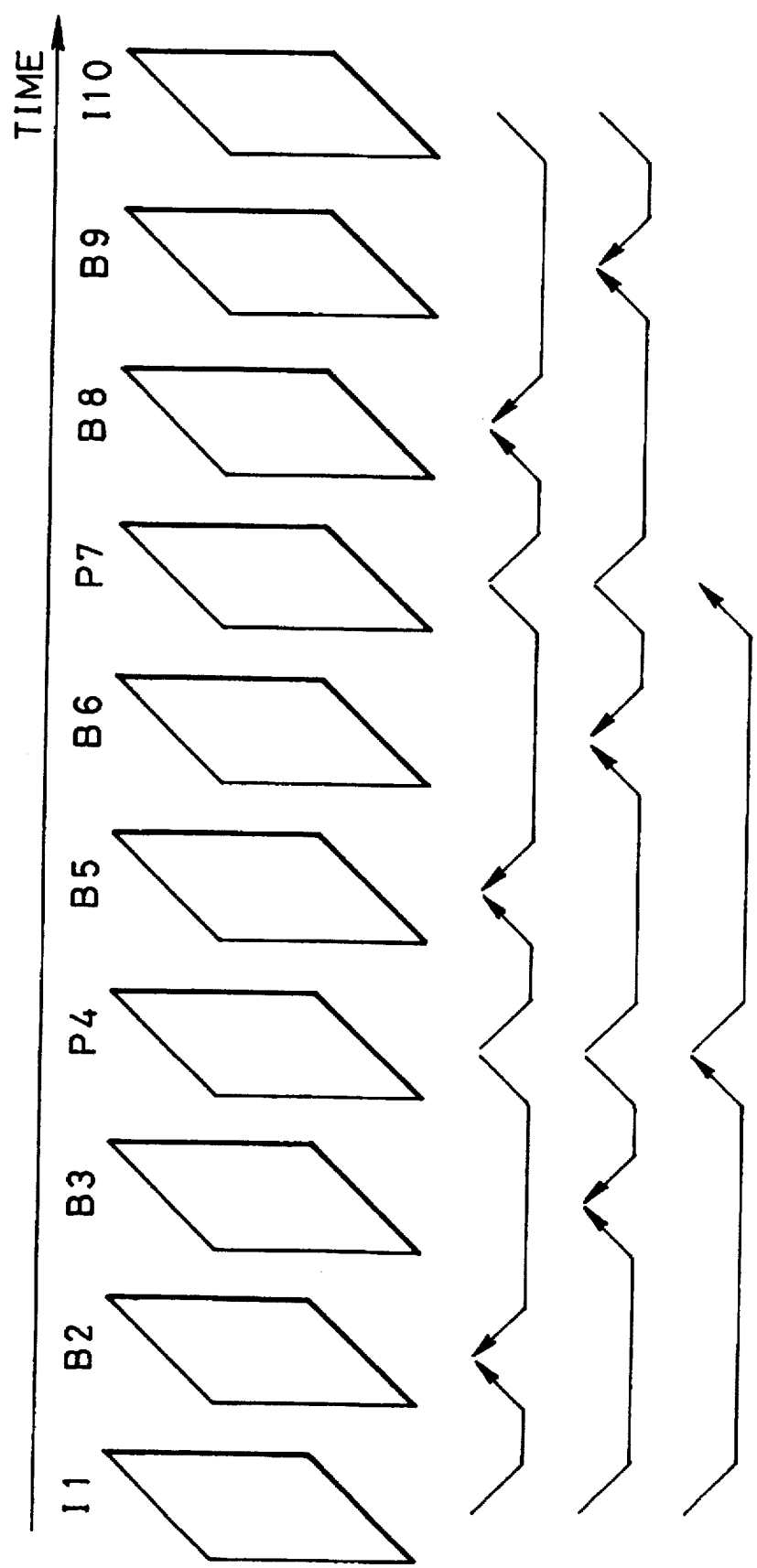
FIG. 12 is an illustration showing an example of coding of frames.

The foregoing process is performed at the process timing as shown in FIG. 9. In FIG. 9, i-1 to i-3 represent detection of the forward motion vector, j-1 to j-3 are results of the forward prediction, k-1 to k-3 represent detection of the backward motion vector. l-1 to l-3 are results of the backward prediction, m1 represents analysis of the results of the forward prediction, m2 represents analysis of the results of the backward prediction, n1 represents correction of the forward motion vector, n2 represents correction of the backward motion vector, o represent the forward, the backward and the bidirectional prediction block generation, p represents determination of the coding type, q represents the prediction block output.

Initially, the motion compensation processors 81-1 to 81-3 detect the forward motion vector. When the forward motion vectors detected by these motion compensation processors 81-1 to 81-3 are output, the prediction result selector 84 makes analysis for the forward prediction result to select one of the forward motion vectors. The motion vector corrector 85 performs correction of the forward motion vector selected by the prediction result selector 84.

Next, in the same process to the above, detection of the backward motion vector, output and correction are performed. Subsequently, the forward prediction block, the backward prediction block and the bidirectional prediction block corresponding to the output forward motion vector and the output backward motion vector are generated from corresponding one of the reference frame memory 82-1 to 82-3 to supply to the motion compensation processor 81-1. From these, the coding type is determined to output the corresponding prediction block based on the determined coding type.

The above-mentioned technology, by simultaneously detecting the motion vectors with dividing the reference region, the time for detecting the motion vector can be shortened. In case of the composition shown in FIG. 8, the motion vector detection time can be shortened to be one third of the conventional system.

Such an idea has been disclosed in the co-pending Japanese Patent Application No. Heisei 5-345916 which corresponds to the commonly owned co-pending U.S. patent application Ser. No. 08/361,652. The entire disclosure of the above-identified co-pending U.S. patent application is herein incorporated by reference.

While the foregoing composition achieves significant shortening of the process time in detection of the motion vector, it still has a room to be improved for better performance. namely, the motion vector is determined at the outside of the motion compensation processor. Therefore, the prediction block generated with reference to the motion vector is generated by the forward prediction block generator 88, the backward prediction block generator 87 and the bidirectional prediction block generator 89 at the outside of the motion compensation processor. Since these are generated by reading out from the external reference frame memories 82-1 to 82-3 which normally have long read out time. Therefore, this part of process inherently requires long time.

Figure 7:
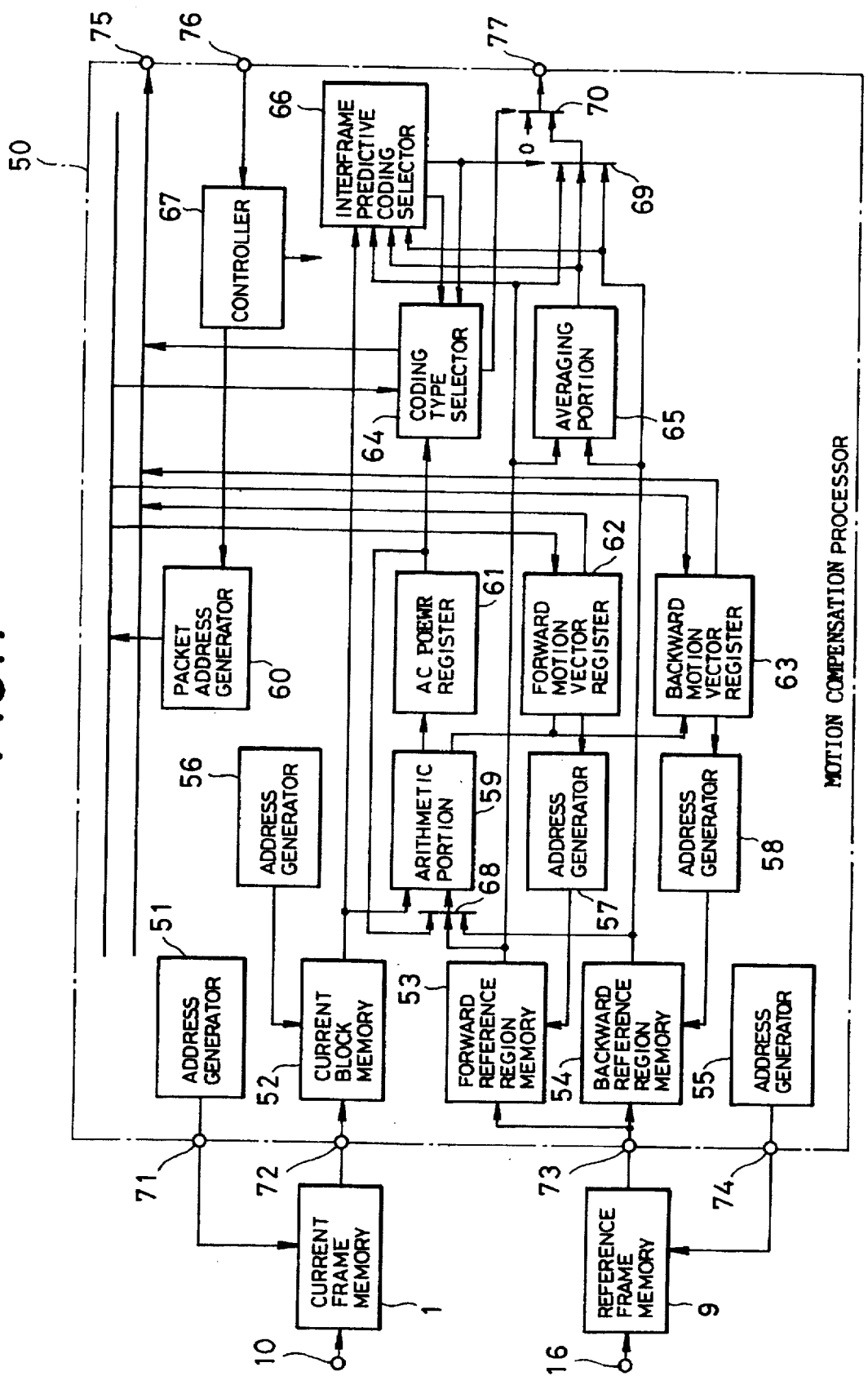
FIG. 7 is a block diagram showing a composition of the motion compensation processor in basic technology of the present invention.

On the other hand, considering the case where the reference region memory (the current block memory 52, the forward reference region memory 53, the backward reference region memory 54) is provided in the motion compensation processor 50, and performs generation of the prediction block within the motion compensation processor 50 as shown in FIG. 7, since the bidirectional prediction block is generated from the forward prediction block and the backward prediction block, the motion compensation processor 81-2, for example, is to generate the bidirectional prediction block from the forward reference region r1 and the backward reference region s1.

Similarly, the motion compensation processor 81-3 is to generate the bidirectional prediction block from the forward reference region r2 and the backward reference region s2. Therefore, since the prediction block is generated employing a narrow reference region, it has low likelihood to generate the bidirectional prediction block having sufficient similarity of the current block, Therefore, it is not possible to attain satisfactorily high data compression ratio.

The present invention has been designed for gaining higher performance in generation of the prediction blocks and in data compression.

Figure 1:
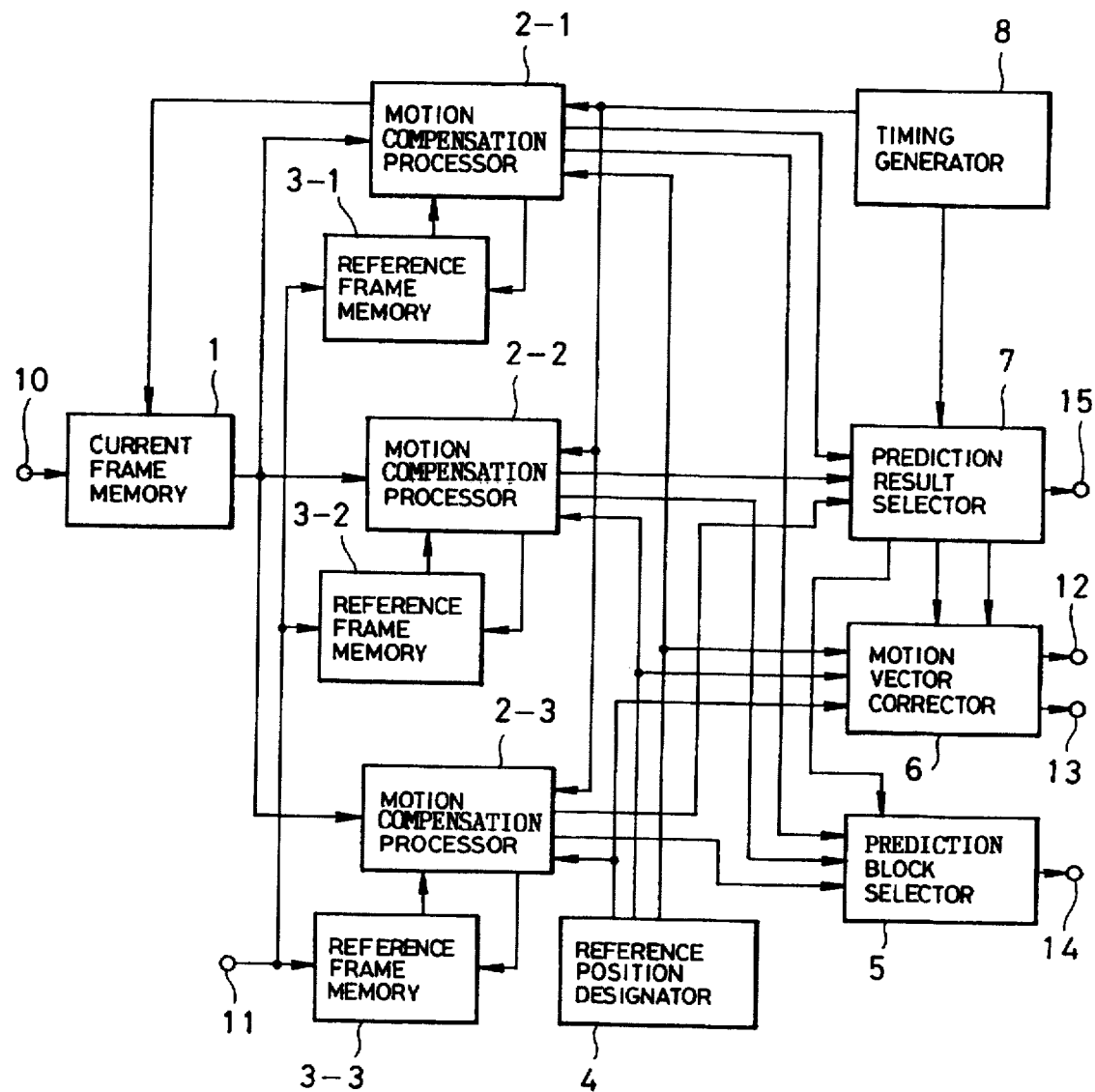
FIG. 1 is a block diagram showing a construction of the preferred embodiment of a bidirectional prediction system according to the present invention.

In FIG. 1, the preferred embodiment of a bidirectional prediction system according to the present invention is a system for parallel process employing three motion compensation processors operating synchronously, similarly to the bidirectional prediction system in the parallel arrangement in the prior art, as illustrated in FIG. 8.

The preferred embodiment of a bidirectional prediction system comprises a current frame memory 1, motion compensation processors 2-1 to 2-3, reference frame memories 3-1 to 3-3, a reference position designator 4, a prediction block selector 5, a motion vector corrector 6, a prediction result selector 7, a timing generator 8 and terminals 10 to 15.

Figure 2:
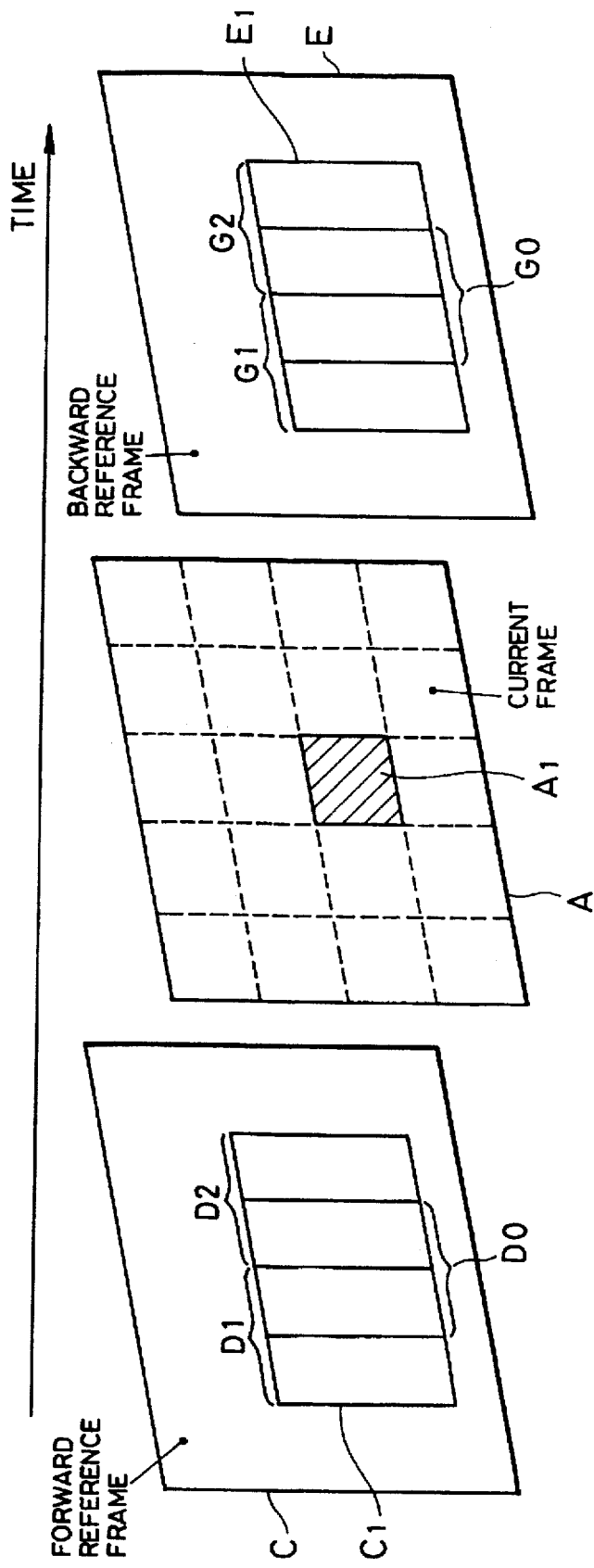
FIG. 2 is an illustration for explaining the preferred embodiment of a bidirectional prediction method according to the present invention.

FIG. 2 is an illustration for explaining the preferred embodiment of a bidirectional prediction method according to the present invention. The preferred embodiment of the bidirectional prediction method according to the present invention will be discussed with reference to FIG. 2.

For example, considering an object moving from left to right in a raster, number of frames in one second is ordinarily 25 to 60 frames, and the frame interval (period) is comparatively short. Thus, the object on the raster slightly varies the position from left to right per frame.

In general, the object in motion moves with slightly varying the position of the raster as elapsing of time unless it moves very fast, the object moves linearly in a short period in the extent of several frames.

Accordingly, when the position of the object in the past frame is located at the left side to the position of the object in the current frame, it is quite likely that the object is positioned in the future frame at the right side relative to the position of the object in the current frame, and it is unlikely that the object is moved at the position left side to the position in the current frame.

The same can be said in other direction, one embodiment of the present invention is worked out in consideration of linearity of the motion of the object on the raster.

In FIG. 2, it is assumed that the current frame A is the B frame. Then, in the process discussed hereinafter, respective blocks in the current frame A are coded in the method estimated to achieve highest compression ratio among four kinds of coding systems of the forward prediction coding, the backward prediction coding, the bidirectional prediction coding and the intraframe coding with reference to the forward reference frame C and the backward reference frame E.

A forward reference region C1 and a backward reference region E1 are set to be elongated in the horizontal direction for increasing the compression ratio while maintaining the image quality by following motion in the horizontal direction of the object on the raster.

At first, the forward reference region C1 and the backward reference region E1 are respectively divided into three smaller regions D0 to D2 and G0 to G2 (hereinafter referred to as "forward reference subregions" and "backward reference sub-regions". The forward reference sub-regions D0 to D2 and the backward reference sub-regions G0 to G2 are arranged to overlap in the horizontal direction.

The areas of the forward reference sub-regions D0 to D2 and the backward reference sub-regions G0 to G2 are set to be equal to each other. The overlapping area of the reference sub-regions corresponds the size M of the current block in the horizontal direction, i.e. for 16 pixels.

As shown in FIG. 2, in the forward reference region C1, the forward reference sub-regions D1, D0, D2 are set in order from the left side. On the other hand, in the backward reference region E1, the backward reference sub-regions G1, G0, G2 are set in order from the left side.

Assuming the forward reference region C1 is horizontal 64 pixels×vertical 32 pixels, the forward reference sub-regions D0 to D2 respectively have horizontal 32 pixels× vertical 32 pixels. The forward reference sub-region D1 forms the left half of the forward reference region C1, the forward reference subregion D0 forms the center portion of the forward reference region C1, and the forward reference sub-region D2 forms the right half of the forward reference region C1.

Assuming the backward reference region E1 is horizontal 64 pixels×vertical 32 pixels, the backward reference sub-regions G0 to G2 respectively have horizontal 32 pixels× vertical 32 pixels. The backward reference sub-region G1 forms the left half of the backward reference region E1, the backward reference sub-region G0 forms the center portion of the backward reference region E1, and the backward reference sub-region G2 forms the right half of the backward reference region E1.

As set forth above, with reference to the divided forward reference region C1 and backward reference region E1, the coding type is determined by the motion compensation processors 2-1 to 2-3 to output the coding type, the motion vector and the prediction block.

In this case, the motion compensation processor 2-1 determines the coding type with reading the preliminarily assigned forward reference sub-region D0 and the backward reference sub-region G0.

On the other hand, the motion compensation processor 2-2 determines the coding type with reading the preliminarily assigned forward reference sub-region D1 and the backward reference sub-region G2.

Furthermore, the motion compensation processor 2-3 determines the coding type with reading the preliminarily assigned forward reference sub-region D2 and backward reference sub-region G1.

Discussion will be given for the operation of the preferred embodiment of the bidirectional prediction system according to the present invention with reference to FIGS. 1 and 2. Hereinafter, it is assumed that the size of the frame is horizontal NX pixels×vertical NY pixels. Here, NX is a multiple of 16 which is the number of pixels in the horizontal direction of the current block, and NY is a multiple of 16 which is the number of pixels in the vertical direction of the current block.

It should be noted that when NX and NY cannot satisfy the foregoing condition, appropriate number of pixels will be added at the right end or lower end of the raster so that the frame can be formed to be a multiple of the numbers of pixels in the horizontal and vertical directions of the current block.

As set forth, the sizes of the forward reference region C1 and the backward reference region E1 are respectively horizontal 64 pixels×vertical 32 pixels, and the sizes of the forward reference sub-regions D0 to D2 and the backward reference sub-regions G0 to G2 are respectively horizontal 32 pixels×vertical 32 pixels.

The motion compensation processors 2-1 to 2-3 are supplied the same timing control signal from the timing generator 8. Also, the motion compensation processors 2-1 to 2-3 have mutually the same composition, and synchronously operate to simultaneously initiate and to simultaneously terminate the process for performing bidirectional prediction in the reference regions of the identical sizes.

On the other hand, to respective of the motion compensation processors 2-1 to 2-3, the reference frame memories 3-1 to 3-3 are connected. Thus, respective motion compensation processors 2-1 to 2-3 read the corresponding forward reference sub-regions D0 to D2 and backward reference sub-regions G0 to G2 from the reference frames stored in the reference frame memories 3-1 to 3-3, while the same reference frame is stored in the reference frame memories 3-1 to 3-3 via the terminal 11.

The positions of the forward reference sub-regions D0 to D2 and the backward reference sub-regions G0 to G2 respectively assigned to the motion compensation processors 2-1 to 2-3 are designated by the reference position designator 4.

Namely, the motion compensation processor 2-1 reads the forward reference sub-region D0 and the backward reference sub-region G0, the motion compensation processor 2-2 reads the forward reference sub-region D1 and the backward reference sub-region G2, and the motion compensation processor 2-3 reads the forward reference sub-region D2 and the backward reference sub-region G1.

The motion compensation processors 2-1 to 2-3 perform bidirectional prediction processes of the common current block supplied from the current frame memory 1 in respective reference regions, in substantially the same manner as the conventional process illustrated in FIG. 7.

Namely, the motion compensation processors 2-1 to 2-3 respectively detect the forward motion vectors and the backward motion vectors, initially, and then generate forward prediction blocks and the backward prediction blocks.

Subsequently, respective motion compensation processors 2-1 to 2-3 generate the bidirectional prediction blocks by averaging respective of the generated forward prediction blocks and backward prediction blocks. The motion compensation processors 2-1 to 2-3 also generate evaluation data for evaluating the similarity of these prediction blocks and the current block.

Respective motion compensation processors 2-1 to 2-3 select the interframe predictive coding type, in which the minimum evaluation data can be obtained, derive the sums of the absolute values of the AC components of the current block, and make a judgement of the coding type for the current block by comparing the sums of the absolute values of the AC components and the minimum evaluation data, and thus select the prediction block.

It should be noted that the forward motion vector and the backward motion vector are detected under a premise that the current block is located at the center of the reference region by the motion compensation processors 2-1 to 2-3 in the similar manner to the prior art. Therefore, correction of the forward motion vector and the backward motion vector depending upon the position of the reference regions becomes necessary.

On the other hand, the forward reference region C1 and the backward reference region E1 should be within the raster. In the process of the motion compensation processor 2-1, the position of the current block on the raster becomes the center of the assigned forward reference sub-region D0 and the assigned backward reference sub-region G0. Therefore, in the process of the motion compensation processor 2-1, no problem will be arisen since the result of block matching with the reference block including the region out of the raster is ignored.

However, in the process of the motion compensation processors 2-2 and 203, the processes are performed under the premise that the position of the current block is at the center of respective of the assigned forward and backward reference sub-regions D1, D2 and G2, G1 while the current block is not located at the center of those sub-regions. Therefore, when the current block is located in the vicinity of the end of the raster, the motion compensation processors 2-2 and 2-3 inherently include the region out of the screen in the forward reference sub-region and/or the backward reference sub-region, and will perform processing without recognition of the fact that the forward and/or backward reference sub-regions include the region out of the screen. Therefore, it is possible that the result of output of the motion compensation processors 2-2 and 2-3 are in error.

Once the determinations of the coding type by the motion compensation processors 2-1 to 2-3 are completed, the results of prediction are output to the prediction result selector 7 in response to the timing control signal output from the timing generator 8, simultaneously.

As a results of prediction, (1) position of the current block on the raster (here, the coordinate of the pixel at the left upper corner of the current block), (2) the evaluation data of similarity of the prediction block and the current block employed upon the determination of the coding type, (3) the coding type of the current block, (4) the forward motion vector and (5) the backward motion vector are output in order.

The prediction result selector 7 selects one of the outputs of the motion compensation processors 2-1 to 2-3, and outputs the identification number of the selected one of the motion compensation processors 2-1 to 2-3, the forward motion vector and the backward motion vector output as results of prediction by the selected one of the motion compensation processors 2-1 to 2-3 to the motion vector corrector 6.

On the other hand, the prediction result selector 7 also outputs the identification number of the selected one of the motion compensation processors 2-1 to 2-3 to the prediction block selector 5. In conjunction therewith, the prediction result selector 7 outputs the coding type as the results of prediction by the selected one of the motion compensation processors 2-1 to 2-3 to the terminal 15.

Namely, in the prediction result selector 7, the position of the current block on the raster as the first data included in the results of prediction is input from the result of prediction of the motion compensation processor 2-1 to exclude the output of the motion prediction processor, in which the forward reference region C1 or the backward reference region E1 becomes out of the raster.

Here, when, as the position of the current block on the raster, the coordinate of the pixel at the left upper corner of the current block is expressed by (ix, iy) ($0 \leq ix < NX$, $0 \leq iy < NY$), the left sides of the forward reference region D1 and the backward reference region G1 become partly out of the raster where ix=0 to ix=16, and the right sides of the forward reference region D2 and the backward reference region G2 become partly out of the raster where ix=NX−32 to ix=NX−16.

Therefore, when the position of the current block is one of the these positions, it is possible that the result of output from the motion compensation processor 2-2 or 2-3 contains error. Therefore, the result of output of the motion compensation processor 2-2 or 2-3 should be omitted.

It should be noted that, similarly, when the iy=0 to iy=16, parts of the upper portions of respective reference regions are placed out of the raster, and when iy=NY−32 to iy=NY−16, parts of the lower portions of respective reference regions are placed out of the raster. However, in the shown example, since the reference regions are not varied the position in the vertical direction, no problem should be arisen.

Accordingly, when the current block is located up to 2 blocks from the left end of the raster or 2 blocks from the right end of the raster, the result of prediction by the motion compensation processor 2-1 is selected.

Next, the prediction result selector 7 compares the evaluation data as the second data contained in the input results of prediction to select one of the motion compensation processors 2-1 to 2-3 which inputs the evaluation data having the minimum value. Then, the prediction result selector 7 obtains the identification number of the selected motion compensation processor.

The minimum value of the evaluation data represents that the prediction block resulting from the interframe prediction performed by the selected motion compensation processor has the highest similarity to the current block. Accordingly, the coding type determined by the evaluation data having the minimum value should be optimal as the coding type of the current block. Therefore, the prediction result selector 7 picks the coding type as the third data contained in the result of prediction output by the selected motion compensation processor and outputs to the terminal 15.

The prediction result selector 7 also takes the forward motion vector and the backward motion vector as the fourth and fifth data contained in the result of prediction performed by the selected motion compensation processor and outputs to the motion vector corrector 6. On the other hand, the prediction result selector 7 outputs the identification number of the selected motion compensation processor to the prediction block selector 5.

The motion vector corrector 6 performs correction of the forward motion vector and the backward motion vector depending upon the input number of the motion compensation processor, and outputs to the terminals 12 and 13. Namely, the motion vector corrector 6 makes correction for the forward motion vector and the backward motion vector in the following manner, assuming that the input forward motion vector is (vx1, vy1) and the input backward motion vector is (vx2, vy2).

On the other hand, when the forward motion vector and the backward motion vector are input from the motion compensation processor 2-1, the corrected forward motion vector becomes (vx1, vy1) and the corrected backward motion vector becomes (vX2, vy2).

When the forward motion vector and the backward motion vector are input from the motion compensation processor 2-2, the corrected forward motion vector becomes (vx1−16, vy1) and the corrected backward motion vector becomes (vx2+16, vy2).

Similarly, when the forward motion vector and the backward motion vector are input from the motion compensation processor 2-3, the corrected forward motion vector becomes (vx1+16, vy1) and the corrected backward motion vector becomes (vx2−16, vy2).

Such correction reflects the difference of the positions of the reference regions of the motion compensation processors 2-1 to 2-3. For instance, the forward reference region D1 of the motion compensation processor 2-2 is located at the position shifted to 16 pixels left from the position of the forward reference region D0 of the motion compensation processor 2-1. Therefore, the actual forward motion vector becomes a correct value by the correction set forth above.

Also, the backward reference region G2 of the motion compensation processor 2-2 is located at the position shifted to 16 pixels right from the position of the backward reference region G0 of the motion compensation processor 2-1. Therefore, the actual forward motion vector becomes correct value by the correction set forth above.

Similarly, the positions of the forward reference region D2 and the backward reference region G1 of the motion compensation processor 2-3 are also offset from the positions of the forward and backward reference regions D0 and G0 of the motion compensation processor 2-1, the forward motion vector and the backward motion vector derived by the motion compensation processor 2-3 become correct value by the correction set forth above.

Accordingly, as a result of detection of the motion vectors in parallel within the reference region placed within the raster employing three motion compensation processors 2-1 to 2-3, the coding type output from the motion compensation processor which outputs the smallest evaluation data, the correct forward motion vector and the correct backward motion vector are output to the terminals 15, 12, 13, respectively.

In this case, ranges of detection of the motion vector assigned for respective motion compensation processors 2-1 to 2-3 are $-8 \leq vx1$, $vx2 \leq 8$, $-8 \leq vy1$, $vy2 \leq 8$, since the size of the reference regions assigned to respective of the motion compensation processors 2-1 to 2-3 is horizontal 32 pixels × vertical 32 pixels. Correcting these in the manner set forth above, the following can be established.

In case of the motion compensation processor 2-1, the forward motion vector becomes $(-8 \leq vx1 \leq 8, -8 \leq vy1 \leq 8)$, and the corrected backward motion vector becomes $(-8 \leq vx2 \leq 8, -8 \leq vy2 \leq 8)$.

In case of the motion compensation processor 2-2, the forward motion vector becomes $(-24 \leq vx1 \leq -8, -8 \leq vy1 \leq 8)$, and the corrected backward motion vector becomes $(8 \leq vx2 \leq 24, -8 \leq vy2 \leq 8)$.

In case of the motion compensation processor 2-3, the forward motion vector becomes $(8 \leq vx1 \leq 24, -8 \leq vy1 \leq 8)$, and the corrected backward motion vector becomes $(-24 \leq vx2 \leq -8, -8 \leq vy2 \leq 8)$.

Accordingly, the range of detection of the forward motion vector becomes $-24 \leq vx1 \leq 24$, $-8 \leq vy1 \leq 8$, and the range of detection of the backward motion vector becomes $-24 \leq vx2 \leq 24$, $-8 \leq vy2 \leq 8$. Thus, three times greater range of detection can be obtained in comparison with the same where only one motion compensation processor is employed.

The prediction block selector 5 is responsive to the identification number of the motion compensation processor selected by the prediction result selector 7, to set an internal selector (not shown) for outputting the prediction block output by the motion compensation processor to a terminal 14.

Accordingly, when the three motion compensation processors 2-1 to 2-3 output the prediction blocks simultaneously in response to the timing control signal output from the timing generator 8. Then, the prediction block selector 5 outputs the prediction block output by the motion compensation processor selected by the prediction result selector 7, to the terminal 14.

As set forth above, by arranging the three motion compensation processors 2-1 to 2-3 in parallel for performing bidirectional prediction in the forward reference region and the backward reference region of horizontal 32 pixels × vertical 32 pixels, the bidirectional prediction is performed within the forward reference region C1 and backward reference region E1 of horizontal 64 pixels × vertical 32 pixels.

On the other hand, respective motion compensation processors 2-1 to 2-3 initiate the processes simultaneously and terminate the processes simultaneously, the process time of one embodiment of the bidirectional prediction according to the invention becomes a sum of the process time of one motion compensation processor and the process time of the prediction result selector 7 and the motion vector corrector 6.

In addition, the processing time can be made smaller in comparison with the processing time of respective motion compensation processors for performing detection of the forward motion vector and the backward motion vector. Namely, the shown embodiment of the invention can perform bidirectional prediction employing twice greater the reference region with equivalent process time to the prior art.

While the foregoing embodiment has been discussed in terms of three motion compensation processors employed in parallel, it should be obvious to employ a greater number of motion compensation processors for further widening the reference region.

In such case, the process time may be maintained substantially comparable with the process time by sole motion compensation processor. On the other hand, circuits added upon parallel arrangement of the motion compensation processors can be relatively simple compositions, such as the prediction result selector 7, the motion vector corrector 6 and the prediction block selector 5.

Figure 3:
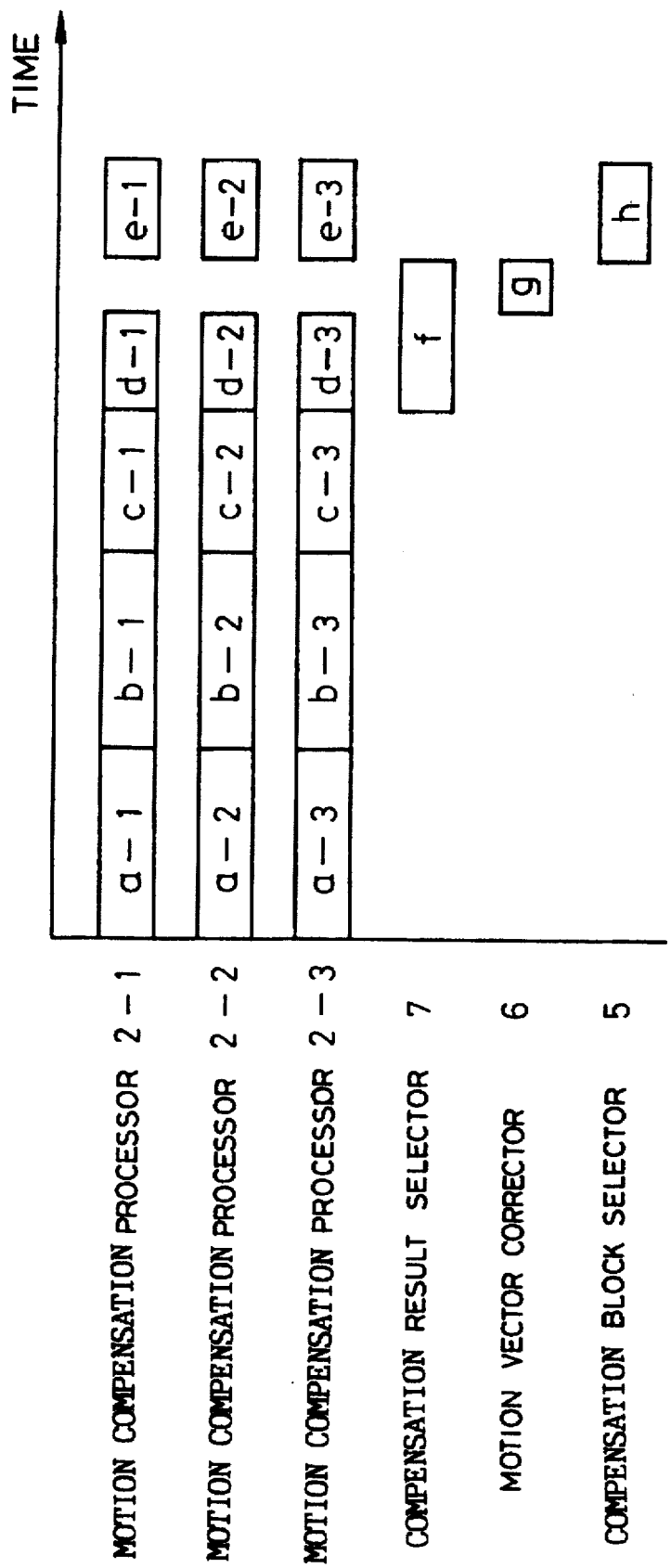
FIG. 3 is an illustration showing a block processing timing in the preferred embodiment of the bidirectional prediction according to the invention.

FIG. 3 shows a block process timing by one embodiment of the invention. In FIG. 3, a-1 to a-3 represent detection of the forward motion vector, b-1 to b-3 represent detection of the backward motion vector, c-1 to c-3 represent determination of the coding type, d-1 to d-3 represent output of the results of prediction, e-1 to e-3 represent output of the prediction blocks, f represents an analysis of the result of prediction, g represents correction of the forward motion vector and the backward motion vector, and h represent selection of the prediction block and output of the selected prediction block.

As shown in FIG. 3, in the motion compensation processors 2-1 to 2-3, the detection of the forward motion vectors a-1 to a-3, the detection of the backward motion vectors b-1 to b-3, determination of the coding types c-1 to c-3, the output of the predicted results d-1 to d-3, output of the prediction blocks e-1 to e-3 are initiated simultaneously and terminated simultaneously. Therefore, the overall process time is substantially comparable with the process time of the sole motion compensation processor.

Figure 4:
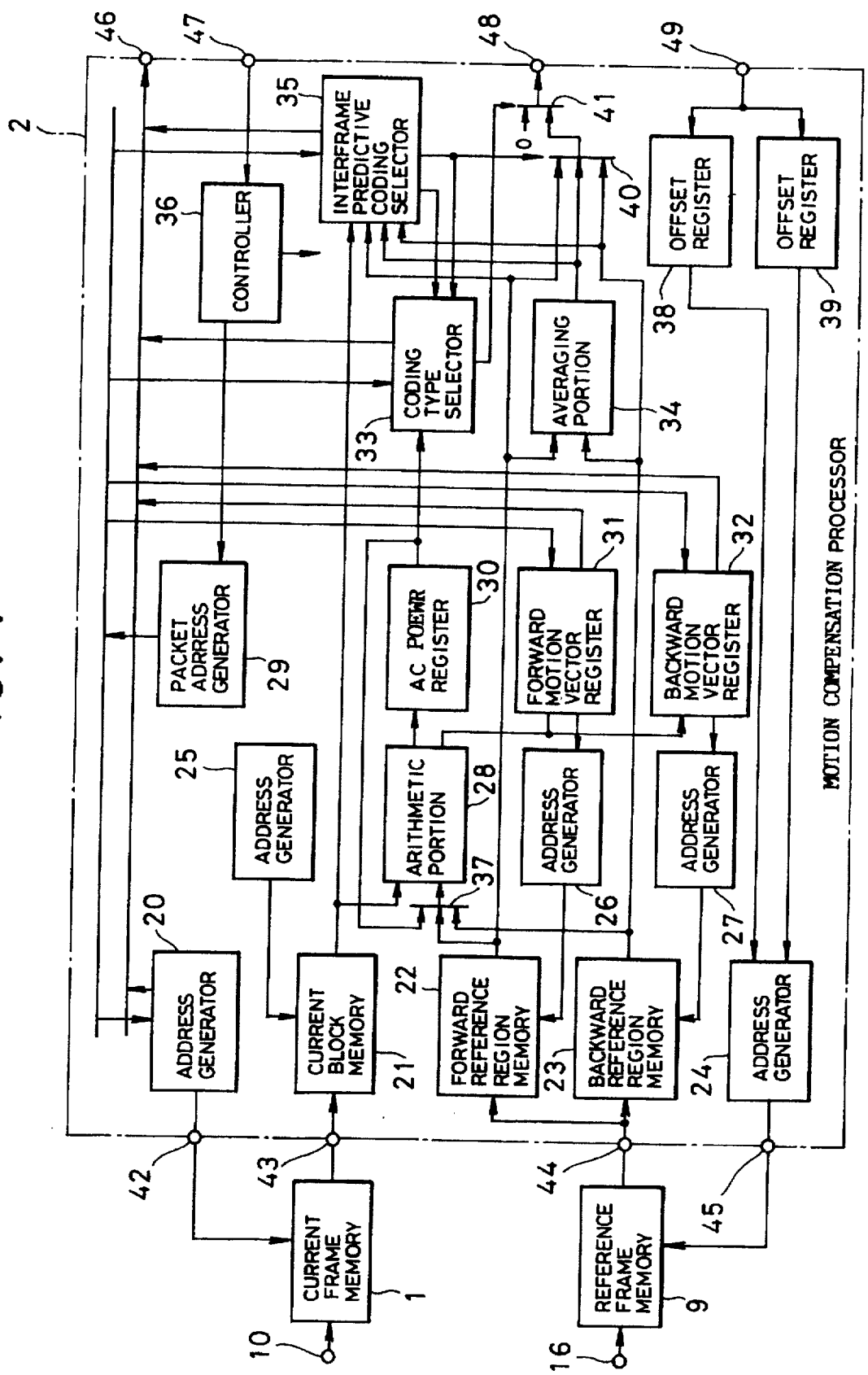
FIG. 4 is a block diagram showing a construction of the preferred embodiment of a motion compensation processor according to the invention.

FIG. 4 is a block diagram showing a composition of the preferred embodiment of the motion compensation processor according to the present invention. In FIG. 4, the motion compensation processor 2 has substantially the same composition to the prior art of FIG. 7 except for addition of a terminal 49 connected to the offset registers 38 and 39, and an address generator 20 and an interframe predictive coding selector 35 are connected to the packet address generator 29.

Namely, the motion compensation processor 2 comprises address generators 20, 24 to 27, a current block memory 21, a forward reference region memory 22, a backward reference region memory 23, an arithmetic portion 28, the packet address generator 29, an AC register 30, a forward motion vector register 31, a backward motion vector register 32, a coding type selector 33, an averaging portion 34, an interframe prediction selector 35, a controller 36, selectors 37, 40 and 41, offset registers 38 and 39, and terminals 42 to 49.

On the other hand, the motion compensation processor 2 is connected to the current frame memory 1 and the reference frame memory 9, respectively. Namely, the current frame memory 1 is connected to the address generator 20 via the terminal 42 and to the current block memory 21 via the terminal 43.

The reference frame memory 9 is connected to the address generator 24 via the terminal 45. Also, the reference frame memory 9 is connected to the forward reference region memory 22 and the backward reference region memory 23 via the terminal 44.

In the motion compensation processor 2, the coordinate of the pixel of the left upper corner of the current block indicative of the position of the current block on the raster is output from the address generator 20 via the terminal 46 included in the result of prediction. On the other hand, the interframe prediction selector 35 outputs the evaluation data indicative of the similarity of the current block and respective prediction blocks to be output to the coding type selector 33, through the terminal 46 included in the result of prediction as well.

At first, operation of the offset registers 38 and 29, and the output order of the result of prediction will be discussed. Then, discussion will be given for the fact that the motion compensation processor 2 may perform a motion prediction similar to the conventional bidirectional prediction system. Also, further discussion will be given for the fact that the preferred embodiment of the motion compensation processor 2 is applicable for the preferred embodiment of the bidirectional motion compensation system according to the invention.

Figure 5:
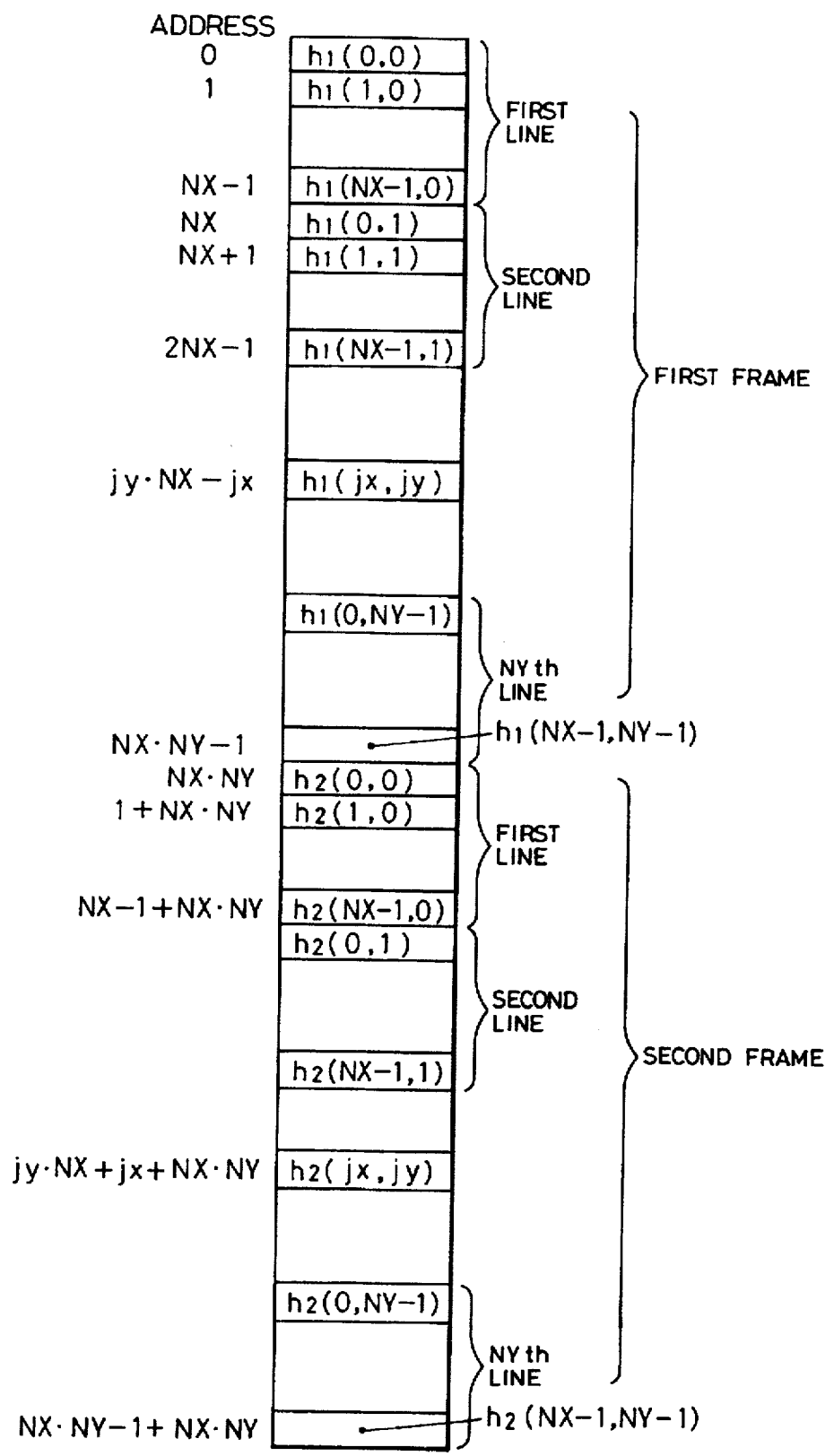
FIG. 5 is an illustration showing a construction of the reference frame memory shown in FIG. 4.

Here, for simplification of disclosure, it is assumed that the address of the reference frame memory 9 stores one pixel in one address, as shown in FIG. 5.

Namely, two frames stored in the reference frame memory 9 are assumed as h1(jx, jy) and h2(jx, jy), in which jx and jy are coordinates in the horizontal and vertical directions and $0 \leq jx < NX$ and $0 \leq jy < NY$. The first lines where jy of the first frame h1(jx, jy) become zero are stored from address 0 to NX−1. Similarly, pixels are stored per one line so that the (NY)th lines where jy become NY−1 are stored from address NX(NY−1) to NX*NY−1 in order. Thus, the address of h1(jx, jy) becomes jy*NX+ix. Where "*" represents "multiplication".

On the other hand, the second frame h2(jx, jy) is stored in the similar manner from the address next to the final address NX*NY of the first frame h1(jx, jy). Such addresses are assigned in the reference frame memory 9. Accordingly, the address of the second frame h2(jx, jy) becomes jy*NX+jx+NX*NY.

The following discussion for the motion compensation processor 2-1 will be given to have forward reference region C1 and the backward reference region E1 having horizontal 32 pixels×vertical 32 pixels.

Therefore, in the normal case where the position of the current block on the raster is located at the center of the forward reference region C1 and the backward reference region E1, if the coordinate of the pixel at the left upper corner of the current block is (ix, iy) ($0 \leq ix < NX$, $0 \leq iy < NY$), the coordinates (jx, jy) ($0 \leq jx < NX$, $0 \leq jy < NY$) of the pixels forming the forward reference region C1 and backward reference region E1 can be expressed as $ix−8 \leq jx < ix+23$, $iy−8 \leq jy < iy+23$.

The offset register 38 is provided for setting offset to be added to the address of the forward reference region C1 read from the external reference frame memory 9, through the terminal 49. On the other hand, the offset register 39 sets an offset to be added to the address of the backward reference region E1 read out from the external reference frame memory 9 through the terminal 49.

The value stored in the offset register 38 is assumed to be "offset 0" and the value stored in the offset register 39 is assumed to be "offset 1". When the coordinate of the pixel at the left upper corner of the current block is (ix, iy) (0≦ix<NX, 0≦iy<NY), the address to be generated by the address generator 24 upon reading of the forward reference region C1 becomes as follow.

The address of the first line of the forward reference region C1 is base+(jy−8)*NX+ix−8+offset 0, . . . , base+ (jy−8)*NX+ix+23+offset 0.

The address of the second line of the forward reference region C1 is base+(jy−7)*NX+ix−8+offset 0, . . . , base+ (jy−7)*NX+ix+23+offset 0.

Similarly, the 32 line of the forward reference region C1 is base+(jy+23)*NX+ix−8+offset 0, . . . , base+(jy+23) *NX+ix+23+offset 0.

However, in the foregoing address, "base" is the address (0 or NX*NY) of the initial pixel of the past frame.

On the other hand, the address to be generated by the address generator 24 upon reading out the backward reference region E1 is as follow.

The address of the first line of the backward reference region E1 is base+(jy−8)*NX+ix−8+offset 1, . . . , base+ (jy−8)*NX+ix+23+offset 1.

The address of the second line of the backward reference region E1 is base+(jy−7)*NX+ix−8+offset 1, . . . , base+ (jy−7)*NX+ix+23+offset 1.

Similarly, the 32 line of the backward reference region E1 is base+(jy+23)*NX+ix−8+offset 1, . . . , base+(jy+23) *NX+ix+23+offset 1.

However, in the foregoing address, "base" is the address (0 or NX*NY) of the initial pixel of the future frame.

The motion compensation processor 2 outputs the results of the prediction in the above-mentioned order according to the packet address generated by the packet address generator 29 via the terminal 46. Also, the motion compensation processor 2 assigns "0", "1", "2", "3" and "4" of the packet address for the address generator 20, the interframe prediction selector 35, the coding type selector 33, forward motion vector register 31 and the backward motion vector register 32.

Namely, for the packet address "0", the position of the current block on the raster (coordinate of the pixel of the left upper corner of the current block) is assigned. For the packet address "1", the evaluation data for evaluating similarity of the prediction block and the current block is assigned. For the packet address "2", the coding type of the current block is assigned. For the packet address "3", the forward motion vector is assigned. For the packet address "4", the backward motion vector is assigned.

Accordingly, when the packet address generator 29 generates the packet addresses "0" to "4" in order, the result of prediction appears on the terminal 46, in order.

Next, operation of the motion compensation processor 2 will be discussed. As set forth above, the motion compensation processor 2 has the terminal 49 connected to the offset registers 38 and 39 in addition to the conventional motion compensation processor to output the position of the current block on the raster and the evaluation data before the result of prediction which has been output conventionally, as the result of prediction.

Therefore, by preliminarily writing "0" in the offset registers 38 and 29 through the terminal 49, "offset 0" and "offset 1" of the address generated by the address generator 24 upon reading of the forward reference region C1 and the backward reference region E1 become "0", respectively. Therefore, the forward reference region C1 and the backward reference region E1, in which the position of the current block on the raster is positioned at the center of the reference regions, can be stored in the forward reference region memory 22 and the backward reference region memory 23. Therefore, similarly to the prior art, the prediction block can be output by employing the forward reference region C1 and backward reference region E1. Therefore, when the motion compensation processor 2 of FIG. 4 can read the same forward reference region C1 and backward reference region E1 with the motion compensation processors 2-1 to 2-3 of FIG. 1, the motion compensation processor 2 is clearly applicable for the bidirectional prediction system illustrated in FIG. 1.

When the values "0" are written in the offset registers 38 and 39 through the terminal 49, the forward reference region C1 and the backward reference region E1, in which the position of the current block on the raster is positioned at the center of the reference regions, can be stored in the forward reference region memory 22 and the backward reference region memory 23.

Accordingly, the forward reference region D0 and the backward reference region G0 shown in FIG. 2 are read so that the motion compensation processor 2 illustrated in FIG. 4 can be employed as the motion compensation processor 2-1 of FIG. 2.

On the other hand, when "−16" is written in the offset register 38 through the terminal 49, the address to be generated by the address generator 24 upon reading of the forward reference region C1 becomes as follow.

The address of the first line of the forward reference region C1 becomes base+(jy−8)*NX+ix−8−16, . . . , base+ (jy−8)*NX+ix+23−16.

On the other hand, the address of the second line of the forward reference region C1 becomes base+(jy−7)*NX+ix−8−16, . . . , base+(jy−7)*NX+ix+23−16.

Similarly, the address of the 32nd line of the forward reference region C1 becomes base+(jy+23)*NX+ix−8−16, . . . , base+(jy+23)*NX+ix+23−16.

This means that when "−16" is written in the offset register 38, the region offset for 16 pixels toward left relative to the case where the value of the offset register 38 is "0", is read. Accordingly, the forward reference region D1 of FIG. 2 is read out.

Similarly, when a value "16" is written in the offset register 39 through the terminal 49, the address generated by the address register 24 upon reading of the backward reference region E1 becomes as follow.

The address of the first line of the backward reference region E1 becomes base+(jy+8)*NX+ix−8+16, . . . , base+ (jy−8)*NX+ix+23+16.

On the other hand, the address of the second line of the backward reference region E1 becomes base+(jy−7)*NX+ ix−8+16, . . . , base+(jy−7)*NX+ix+23+16.

Similarly, the address of the 32nd line of the backward reference region E1 becomes base+(jy+23)*NX+ix−8+16, . . . , base+(jy+23)*NX+ix+23+16.

This means that when "16" is written in the offset register 39, the region offset for 16 pixels toward right relative to the case where the value of the offset register 39 is "0", is read. Accordingly, the backward reference region G2 of FIG. 2 is read out.

Therefore, the foregoing corresponds to reading of the forward reference region D1 and the backward reference region G2 shown in FIG. 2 are read. Therefore, the motion compensation processor 2 of FIG. 4 is applicable as the motion compensation processor of 2-2 of FIG. 1.

Similarly, when the value "16" is written in the offset register 38 via the terminal 49 and the value "−16" is written in the offset register 39 via the terminal 49, the forward reference region D2 and the backward reference region G1 of FIG. 2 are read. Therefore, the motion compensation processor 2 of FIG. 4 can be employed as the motion compensation processor 2-3 of FIG. 1.

Accordingly, when "0" is written in the offset register 38 and "0" is written in the offset register 39, the motion compensation processor 2 can be employed as the motion compensation processor 2-1 of FIG. 1. Similarly, when "−16" is written in the offset register 38 and "16" is written in the offset register 39, the motion compensation processor 2 can be employed as the motion compensation processor 2-2. Also, when "16" is written in the offset register 38 and "−16" is written in the offset register 39, the motion compensation processor 2 can be employed as the motion compensation processor 2-3.

As set forth above, the motion compensation processor 2 illustrated in FIG. 4 can be used as the motion compensation processors 2-1 to 2-3 of the bidirectional prediction system of FIG. 1. It should be noted that while the shown embodiment has been illustrated and discussed in terms of an example, in which the forward reference region and the backward reference region are moved in the horizontal direction, it is possible to move these reference regions in other directions by appropriately setting the values of the offset registers 38 and 39.

Figure 6:
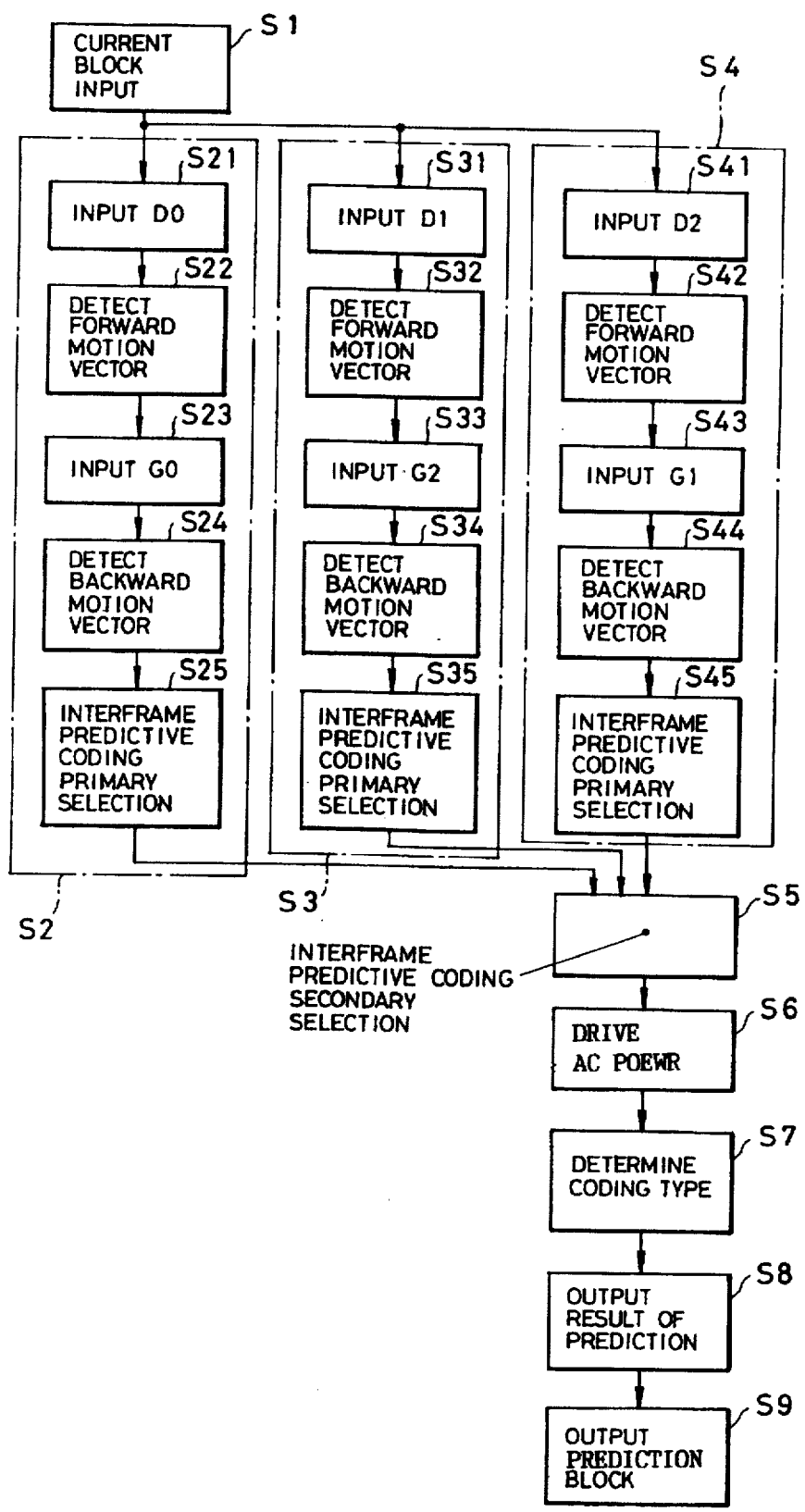
FIG. 6 is a flowchart showing a processing operation of the preferred embodiment of the bidirectional prediction method according to the present invention.

FIG. 6 shows a flowchart showing the process operation of the preferred embodiment of the bidirectional prediction method according to the present invention. The shown embodiment of the bidirectional prediction method according to the present invention will be discussed with reference to FIG. 6.

At first, when the current block is input at the current block input step S1, the input current block is supplied to processes S2 to S4.

In respective process of the steps S2 to S4, respective forward reference regions D0 to D2 are input at a forward reference region D0 input step S21, a forward reference region D1 input step S31 and a forward reference region D2 input step S41. Subsequently, at forward motion vector detecting steps S22, S32, S42, detection of the forward motion vectors in respective forward reference regions D0 to D2 can be performed.

Similarly, respective backward reference regions G0 to G2 are input at a backward reference region G0 input step S23, a backward reference region G1 input step S33 and a backward reference region G2 input step S44. Subsequently, at the backward motion vector detecting steps S24, S34, S44, detection of the backward motion vectors in respective backward reference regions G0 to G2 can be performed.

At interframe coding primary selection steps S25, S35 and S45, the forward prediction block, the backward prediction block and the bidirectional prediction block are generated in the similar manner to the prior art. Then, in the similar manner to the prior art, the evaluation data for evaluating similarity to the current block are calculated by employing the sum of the absolute values of the prediction error of the foregoing equation (1).

At the interframe coding primary selection steps S25, S35 and S45, the calculated evaluation data are compared with each other to select the prediction block having the smallest value and the candidate of the interframe predictive coding. In such case, the evaluation data, the candidate of the forward motion vector and the candidate of the backward motion vector may also be stored.

Respective process steps of S21 to S25, S31 to S35 and S41 to S45 of the process steps S2 to S4, three sets of the candidates of the interframe predictive coding, the evaluation data for evaluating similarity between the prediction blocks and the current block in the systems, the candidates of the forward motion vector and the candidate of the backward motion vector are obtained.

Next, at an interframe predictive coding secondary selection step S5, one of the above-mentioned three interframe predictive coding is selected. The method of selection is the same as the conventional method. That is, the evaluation data respectively corresponding to the candidates of the interframe predictive coding are compared to select the interframe predictive coding system candidate having the smallest evaluation data.

Subsequently, at a step of deriving the sum of the absolute value of AC component S6 derives the sum of the absolute value of AC component. Then, at a coding type determining step S7, comparison of the sum of the absolute value of AC component derived at the step S6 and the evaluation data corresponding to the interframe predictive coding selected by the interframe predictive coding secondary selection step S5 to determine the coding type.

At a prediction result outputting step S8, when the coding type is the interframe predictive coding system candidate, the determined coding type and the motion vector corresponding thereto are output. Subsequently, at a prediction block output step S9, the prediction block identified by the determined coding type is generated and output.

Similarly to the prior art, the prediction block is a block having "0" in all values in case of the intraframe coding, and otherwise the prediction block of the interframe predictive coding candidate selected by the foregoing interframe predictive coding secondary selection step S5.

By the precesses of the steps S1 to S9, the conventional motion compensation process can be performed. It should be noted that while the foregoing discussion has been given in terms of the B frame, the processes for the P frame and I frame can be realized by partly modifying the above-mentioned process for the B frame.

Namely, in the P frame, the forward predictive coding is constantly selected as the interframe predictive coding system. In the I frame, the intraframe coding is always selected as the coding type.

Comparing the above-mentioned bidirectional prediction method as set forth above with a method to perform bidirectional prediction with making reference to the forward reference region C1 and the backward reference region E1 as a single reference region, the above-mentioned bidirectional prediction method generates the forward reference region and the backward reference region respectively having sizes of one-half of the conventional reference region.

It should be noted that normally, the past reference frame, current frame and the future reference frame have an interval in the order of 3 to 5 frames. Therefore, when the object moving from left to right on the raster appears on the current block, it is highly possible that the prediction block having high similarity to the current block is found in the step S3, in which the forward reference region D1 and the backward reference region G2 are combined.

On the other hand, when the object moving from right to left on the raster appears on the current block, it is highly possible that the prediction block having high similarity to the current block is found at the step S4 where the forward reference region D2 and the backward reference region G1 are combined.

Furthermore, when the object which does not move appears on the current block, it is highly possible that the prediction block having high similarity to the current block is found at the step S2 where the forward reference region D0 and the backward reference region G0 are combined.

Accordingly, by employing the bidirectional prediction method as set forth above, it can be expected that the prediction block having comparable similarity to the current block to the conventional method can be obtained.

On the other hand, since the forward reference region C1 and the backward reference region E1 are divided into respective forward reference regions D0 to D2 and the backward reference regions G0 to G2 and setting in the overlapping manner, parallel process as shown in FIG. 6 for a set of the forward reference region D0 and the backward reference region G0, a set of the forward reference region D1 and the backward reference region G2, and a set of the forward reference region D2 and the backward reference region G1 can be facilitated.

Furthermore, comparing the necessary memory capacity for performing these processes, while the conventional reference region is horizontal 64 pixels×vertical 32 pixels, the above-mentioned bidirectional prediction method has the reference region of horizontal 32 pixels×vertical 32 pixels. Thus, the required memory capacity becomes half. Therefore, memory consumption can be significantly reduced.

It should be noted that while the above-mentioned embodiment of the invention enlarges the reference region in the horizontal direction, similarly the reference region can be enlarged in the vertical direction. For example, it is to be selected that the forward reference region and the backward reference region are horizontal 32 pixels×vertical 64 pixels, and respective reference region is devided in three sub-regions of horizontal 32 pixels×vertical 32 pixels to overlap each other.

It should be appreciated that the similar effect to the preferred embodiment of the invention can be obtained by performing bidirectional prediction with a set of the forward reference region at the center portion and the backward reference region at the center portion, a set of the forward reference region at the upper half and the backward reference region at the lower half, and a set of the forward reference region at the lower half and the backward reference region at the upper half.

Also, it is further possible to perform bidirectional prediction by combining forward reference region and the backward reference region diagonally symmetric with respect to the current block by increasing number of divided reference regions in the horizontal direction and the vertical direction.

As set forth above, by dividing the forward reference region C1 and the backward reference region E1 into a plurality of smaller area regions having mutually equal areas, establishing sets of the forward reference region D1 and the backward reference region G2 or the forward reference region D2 and the backward reference region G1, respectively located at symmetric position relative to the current block, and performing bidirectional prediction with respect to each set, parallel process which is easy to realize by the system can be enabled. Furthermore, the prediction block having similarity to the current block comparable with the prior art can be obtained.

On the other hand, in the foregoing bidirectional prediction system performing parallel processing with the bidirectional prediction method as set forth above, the prediction block having similarity to the current block comparable with the prior art can be obtained in a shorter time.

In addition, in the above-mentioned bidirectional prediction system employing the above-mentioned bidirectional prediction method the prediction block can be obtained from the memories in the motion compensation processors 2-1 to 2-3, and therefore high speed process in comparison with the conventional system becomes possible. By the high speed process, it becomes possible to increase the number of blocks in the frame, and thus to process a larger image.

Furthermore, the motion compensation processor 2 permits realization of the bidirectional prediction system as solely employed or as arranged in parallel. This facilitates parallel arrangement of the motion compensation processors. In such a case, when the motion compensation processors 2 are arranged in parallel, the process period can be comparable with the case where the motion compensation processor 2 is solely employed. Therefore, even when higher compression ratio with maintaining the image quality, real time processing becomes possible.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments and equivalents thereof with respect to the features set out in the appended claims.

What is claimed is:

1. A bidirectional motion compensation method both in toward past and toward future in a video encoder performing compression of data amount of motion pictures, comprising the steps of:

performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

performing motion compensation in past on the basis of the first forward reference region and in future on the basis of the second backward reference region;

performing motion compensation in past on the basis of the second forward reference region and in future on the basis of the first backward reference region; and selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward reference region, the second forward reference region and the first backward reference region, and the third forward reference region and the third backward reference region.

2. A bidirectional motion compensation method as set forth in claim 1, which further comprises a step of outputting the prediction block for coding said current block depending upon the selected coding type.

3. A bidirectional motion compensation method both in toward past and toward future in a video encoder image processing system performing compression of data amount of motion pictures, comprising the steps of:

performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

performing motion compensation in past on the basis of the first forward reference region and in future on the basis of the second backward reference region;

performing motion compensation in past on the basis of the second forward reference region and in future on the basis of the first backward reference region; and selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward reference region, the second forward reference region and the first backward reference region, and the third forward reference region and the third backward reference region; and outputting a result of compensation including said coding type with inserting position information on the frame of said current block and an evaluation data for evaluating similarity of said prediction block and said current block before said result of compensation.

4. A bidirectional motion compensation method both in toward past and toward future in a video encoder performing compression of data amount of motion pictures, comprising the steps of:

performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

performing motion compensation in past on the basis of the first forward reference region and in future on the basis of the second backward reference region;

performing motion compensation in past on the basis of the second forward reference region and in future on the basis of the first backward reference region; and selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward reference region, the second forward reference region and the first backward reference region, and the third forward reference region and the third backward reference region; and outputting prediction block for coding said current block depending upon selected coding type; and outputting a result of compensation including said coding type with inserting position information on the frame of said current block and an evaluation data for evaluating similarity of said prediction block and said current block before said result of compensation.

5. A bidirectional motion compensation method both in toward past and toward future in a video encoder performing compression of data amount of motion pictures, comprising the steps of:

performing motion prediction both in past and future on the basis of data of a third forward reference region among first, second and third forward reference regions within a forward prediction block generated from a past reference frame of said motion pictures and mutually having equal areas, said first and second forward reference regions being in contact with each other, and said third forward reference region overlapping with said first and second forward reference regions in mutually equal areas, and data of a third backward reference region among first, second and third backward reference regions within a backward prediction block generated from a future reference frame of said motion pictures and mutually having equal areas, said first and second backward reference regions being in contact with each other, and said third backward reference region overlapping with said first and second backward reference regions in mutually equal areas;

extracting said first forward reference region from said past reference frame and extracting said second backward reference region from said future reference frame;

performing prediction of motion both in past and future on the basis of said first forward reference region and said second backward reference region;

extracting said second forward reference region from said past reference frame and extracting said first backward reference region from said future reference frame;

performing prediction of motion both in past and future on the basis of said second forward reference region and said first backward reference region;

selecting a coding type among one method selected from interframe predictive coding employing forward prediction block, interframe predictive coding employing backward prediction block and interframe predictive coding employing bidirectional prediction block generated from said forward prediction block and said backward prediction block, and an intraframe coding method for coding a current block divided from the current frame of said motion pictures;

outputting a result of prediction including said coding type with inserting position information on the raster of said current block and an evaluation data for evaluating similarity of said prediction block and said current block before said result of prediction.

6. A bidirectional motion compensation method both in toward past and toward future in a video encoder performing compression of data amount of motion pictures, comprising the steps of:

performing motion prediction both in past and future on the basis of data of a third forward reference region among first, second and third forward reference regions within a forward prediction block generated from a past reference frame of said motion pictures and mutually having equal areas, said first and second forward reference regions being in contact with each other, and said third forward reference region overlapping with said first and second forward reference regions in mutually equal areas, and data of a third backward reference region among first, second and third backward reference regions within a backward prediction block generated from a future reference frame of said motion pictures and mutually having equal areas, said first and second backward reference regions being in contact with each other, and said third backward reference region overlapping with said first and second backward reference regions in mutually equal areas;

extracting said first forward reference region from said past reference frame and extracting said second backward reference region from said future reference frame;

performing prediction of motion both in past and future on the basis of said first forward reference region and said second backward reference region;

extracting said second forward reference region from said past reference frame and extracting said first backward reference region from said future reference frame;

performing prediction of motion both in past and future on the basis of said second forward reference region and said first backward reference region;

selecting a coding type among one method selected from interframe predictive coding employing forward prediction block, interframe predictive coding employing backward prediction block and interframe predictive coding employing bidirectional prediction block generated from said forward prediction block and said backward prediction block, and an intraframe coding method for coding a current block divided from the current frame of said motion pictures;

outputting prediction block for coding said current block depending upon selected coding type; and outputting a result of prediction including said coding type with inserting position information on the raster of said current block and an evaluation data for evaluating similarity of said prediction block and said current block before said result of compensation.

7. A bidirectional motion compensation system both in toward past and toward future in a video encoder performing compression of data amount of motion pictures, comprising:

means for performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

means for performing motion compensation in past on the basis of the first forward reference region and in future on the basis of the second backward reference region;

means for performing motion compensation in past on the basis of the second forward reference region and in future on the basis of the first backward reference region; and means for selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward reference region, the second forward reference region and the first backward reference region, and the third forward reference region and the third backward reference region.

8. A bidirectional motion compensation system as set forth in claim 7, which further comprises means for outputting the prediction block for coding current block depending upon the selected coding type.

9. A bidirectional motion compensation system both in toward past and toward future in a video encoder performing compression of data amount of motion pictures, comprising:

means for performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

means for performing motion compensation in past on the basis of the first forward reference region and in future on the basis of the second backward reference region;

means for performing motion compensation in past on the basis of the second forward reference region and in future on the basis of the first backward reference region; and means for selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward reference region, the second forward reference region and the first backward reference region, and the third forward reference region and the third backward reference region; and means for outputting a result of compensation including said coding type with inserting position information on the frame of said current block and an evaluation data for evaluating similarity of said prediction block and said current block before said result of compensation.

10. A bidirectional motion compensation system both in toward past and toward future in a video encoder performing compression of data amount of motion pictures, comprising:

means for performing motion compensation in past on the basis of data of a third forward reference region among first, second and third forward reference regions mutually having equal areas for a part of a past reference frame of the motion pictures, and the third forward reference region overlapping with the first and second forward reference regions in mutually equally areas, and in future on the basis of data of a third backward reference region among first, second and third backward reference regions mutually having equal areas for a continuous part of a future reference frame of the motion pictures, and the third backward reference region overlapping with the first and second backward reference regions;

means for performing motion compensation in past on the basis of the first forward reference region and in future on the basis of the second backward reference region;

means for performing motion compensation in past on the basis of the second forward reference region and in future on the basis of the first backward reference region; and means for selecting a coding type for a current block divided from the current frame of the motion pictures among one method selected from intraframe coding, forward predictive coding employing a forward prediction block generated from one of the first, the second and the third of the forward reference region, backward predictive coding employing a backward prediction block generated from one of the first, the second and the third of the backward reference region, bidirectional predictive coding employing a bidirectional prediction block generated from one of three combinations, the first forward reference region and the second backward referense region, the second forward reference region and the first backward reference region, and the third forward reference region and the third backward reference region; means for outputting compensation block for coding said current block depending upon selected coding type; and means for outputting a result of compensation including said coding type with inserting position information on the frame of said current block and an evaluation data for evaluating similarity of said prediction block and said current block before said result of compensation.

11. A bidirectional motion compensation system both in toward past and toward future in a video encoder performing compression of data amount of motion pictures, comprising:

means for performing motion prediction both in past and future on the basis of data of a third forward reference region among first, second and third forward reference regions within a forward prediction block generated from a past reference frame of said motion pictures and mutually having equal areas, said first and second forward reference regions being in contact with each other, and said third forward reference region overlapping with said first and second forward reference regions in mutually equal areas, and data of a third backward reference region among first, second and third backward reference regions within a backward prediction block generated from a future reference frame of said motion pictures and mutually having equal areas, said first and second backward reference regions being in contact with each other, and said third backward reference region overlapping with said first and second backward reference regions in mutually equal areas;

means for extracting said first forward reference region from said past reference frame and extracting said second backward reference region from said future reference frame;

means for performing prediction of motion both in past and future on the basis of said first forward reference region and said second backward reference region;

means for extracting said second forward reference region from said past reference frame and extracting said first backward reference region from said future reference frame;

means for performing prediction of motion both in past and future on the basis of said second forward reference region and said first backward reference region;

means for selecting a coding type among one method selected from interframe predictive coding employing forward prediction block, interframe predictive coding employing backward prediction block and interframe predictive coding employing bidirectional prediction block generated from said forward prediction block and said backward prediction block, and an intraframe coding method for coding a current block divided from the current frame of said motion pictures;

means for outputting a result of prediction including said coding type with inserting position information on the raster of said current block and an evaluation data for evaluating similarity of said prediction block and said current block before said result of compensation.

12. A bidirectional motion compensation system both in toward past and toward future in a video encoder performing compression of data amount of motion pictures, comprising:

means for performing motion prediction both in past and future on the basis of data of a third forward reference region among first, second and third forward reference regions within a forward prediction block generated from a past reference frame of said motion pictures and mutually having equal areas, said first and second forward reference regions being in contact with each other, and said third forward reference region overlapping with said first and second forward reference regions in mutually equal areas, and data of a third backward reference region among first, second and third backward reference regions within a backward prediction block generated from a future reference frame of said motion pictures and mutually having equal areas, said first and second backward reference regions being in contact with each other, and said third backward reference region overlapping with said first and second backward reference regions in mutually equal areas;

means for extracting said first forward reference region from said past reference frame and extracting said second backward reference region from said future reference frame;

means for performing prediction of motion both in past and future on the basis of said first forward reference region and said second backward reference region;

means for extracting said second forward reference region from said past reference frame and extracting said first backward reference region from said future reference frame;

means for performing prediction of motion both in past and future on the basis of said second forward reference region and said first backward reference region;

means for selecting a coding type among one method selected from interframe predictive coding employing forward prediction block, interframe predictive coding employing backward prediction block and interframe predictive coding employing bidirectional prediction block generated from said forward prediction block and said backward prediction block, and an intraframe coding method for coding a current block divided from the current frame of said motion pictures;

means for outputting prediction block for coding said current block depending upon selected coding type; and means for outputting a result of prediction including said coding type with inserting position information on the raster of said current block and an evaluation data for evaluating similarity of said prediction block and said current block before said result of compensation.

\* \* \* \* \*